US012365561B2

(12) United States Patent
Takashima et al.

(10) Patent No.: US 12,365,561 B2
(45) Date of Patent: Jul. 22, 2025

(54) THREADLIKE ADHESIVE STICKING APPARATUS AND METHOD OF STICKING THREADLIKE ADHESIVE

(71) Applicant: NITTO DENKO CORPORATION, Ibaraki (JP)

(72) Inventors: Atsushi Takashima, Ibaraki (JP); Tomohiro Taruno, Ibaraki (JP); Hiromitsu Morishita, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 300 days.

(21) Appl. No.: 17/915,873

(22) PCT Filed: Mar. 26, 2021

(86) PCT No.: PCT/JP2021/013144
§ 371 (c)(1),
(2) Date: Sep. 29, 2022

(87) PCT Pub. No.: WO2021/200760
PCT Pub. Date: Oct. 7, 2021

(65) Prior Publication Data
US 2023/0126074 A1 Apr. 27, 2023

(30) Foreign Application Priority Data

Mar. 31, 2020 (JP) .................................. 2020-064048

(51) Int. Cl.
*B65H 51/10* (2006.01)
*B65B 51/06* (2006.01)
(Continued)

(52) U.S. Cl.
CPC ............. *B65H 51/10* (2013.01); *B65H 57/14* (2013.01); *C09J 9/00* (2013.01); *B65B 51/06* (2013.01); *B65H 2701/377* (2013.01)

(58) Field of Classification Search
CPC ........... B65B 51/06; C09J 201/00; C09J 9/00; B65H 2701/377; B65H 51/10; B65H 57/14
See application file for complete search history.

(56) References Cited

U.S. PATENT DOCUMENTS

2012/0279664 A1 11/2012 Sakamoto
2023/0126074 A1* 4/2023 Takashima ............. C09J 201/00
271/8.1

FOREIGN PATENT DOCUMENTS

JP    S60-44463 A    3/1985
JP    H3-119083 A    5/1991
(Continued)

OTHER PUBLICATIONS

International Search Report issued for corresponding International Patent Application No. PCT/JP2021/013144 on Jun. 1, 2021, along with an English translation (5 pages).

(Continued)

Primary Examiner — Sonya M Sengupta
(74) Attorney, Agent, or Firm — Hauptman Ham, LLP

(57) ABSTRACT

A threadlike adhesive sticking apparatus of the present invention is an adhesive sticking apparatus that presses a threadlike adhesive wound around a winding body against an object while feeding out the threadlike adhesive, and includes an assist mechanism configured to apply an external force in a feeding direction to the threadlike adhesive fed out from the winding body, and a pressing unit configured to press the threadlike adhesive fed out from the winding body against the object.

11 Claims, 26 Drawing Sheets

(51) Int. Cl.
*B65H 57/14* (2006.01)
*C09J 9/00* (2006.01)

(56) References Cited

FOREIGN PATENT DOCUMENTS

| | | |
|---|---|---|
| JP | H3-231980 A | 10/1991 |
| JP | H9-278283 A | 10/1997 |
| JP | H10-59620 A | 3/1998 |
| JP | 2004-58003 A | 2/2004 |
| JP | 2008-235685 A | 10/2008 |
| JP | 4793608 B2 | 10/2011 |
| JP | 2016-74538 A | 5/2016 |
| JP | 6577915 B2 | 9/2019 |

OTHER PUBLICATIONS

Written Opinion issued for corresponding International Patent Application No. PCT/JP2021/013144 on Jun. 1, 2021 (5 pages).
Notice of Reasons for Refusal dated Nov. 12, 2024 for corresponding Japanese Patent Application No. 2021-053926, along with an English machine translation (10 pages).
Office Action issued on Sep. 11, 2024 for corresponding Taiwanese Patent Application No. 110111845 along with an English translation (19 pages).
Office Action issued on May 2, 2025 for corresponding Taiwanese Patent Application No. 110111845, along with an English translation (5 pages).

* cited by examiner

FIG. 2
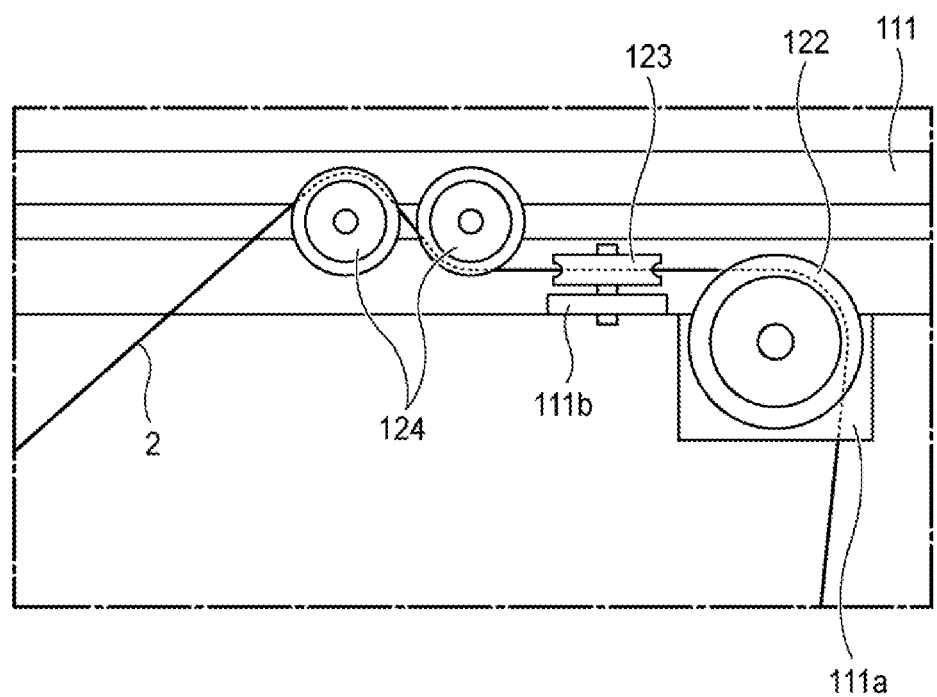
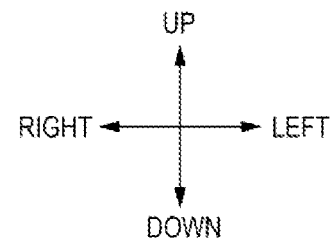

FIG. 3
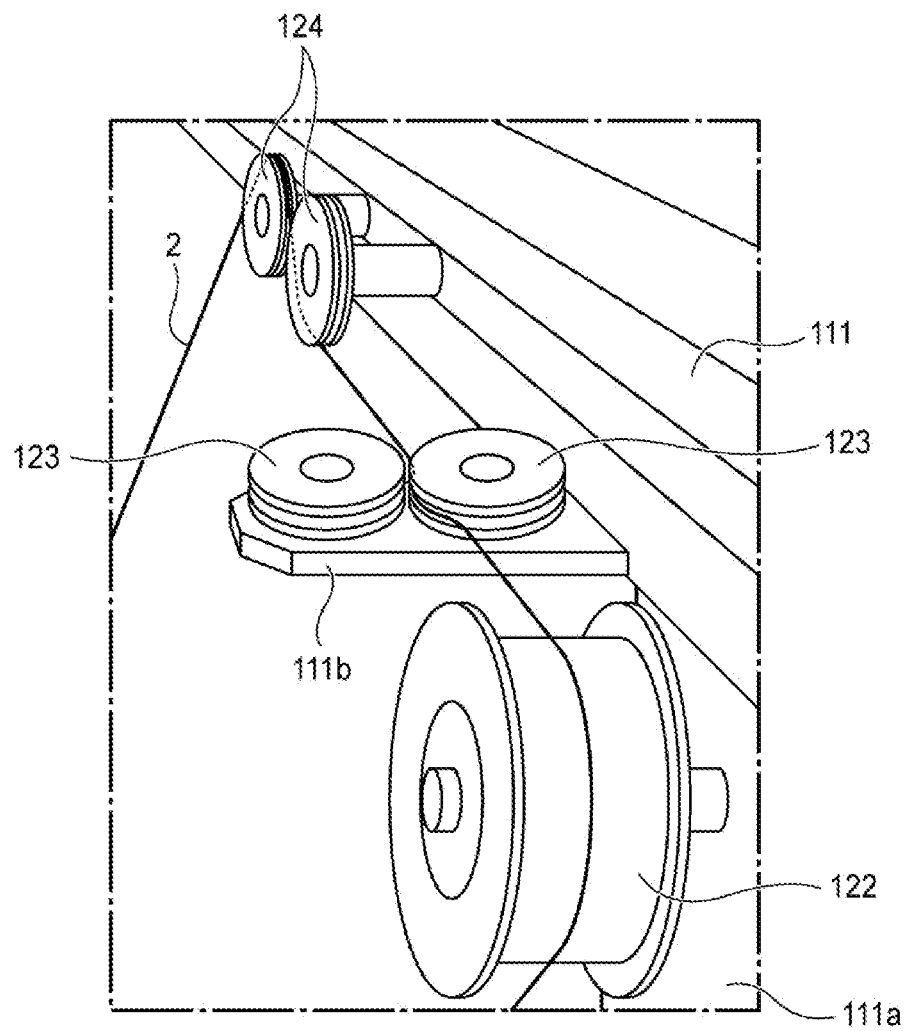
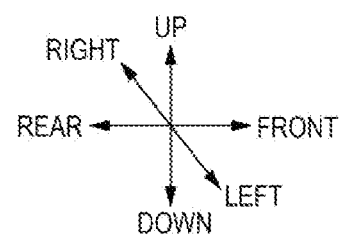

FIG. 4
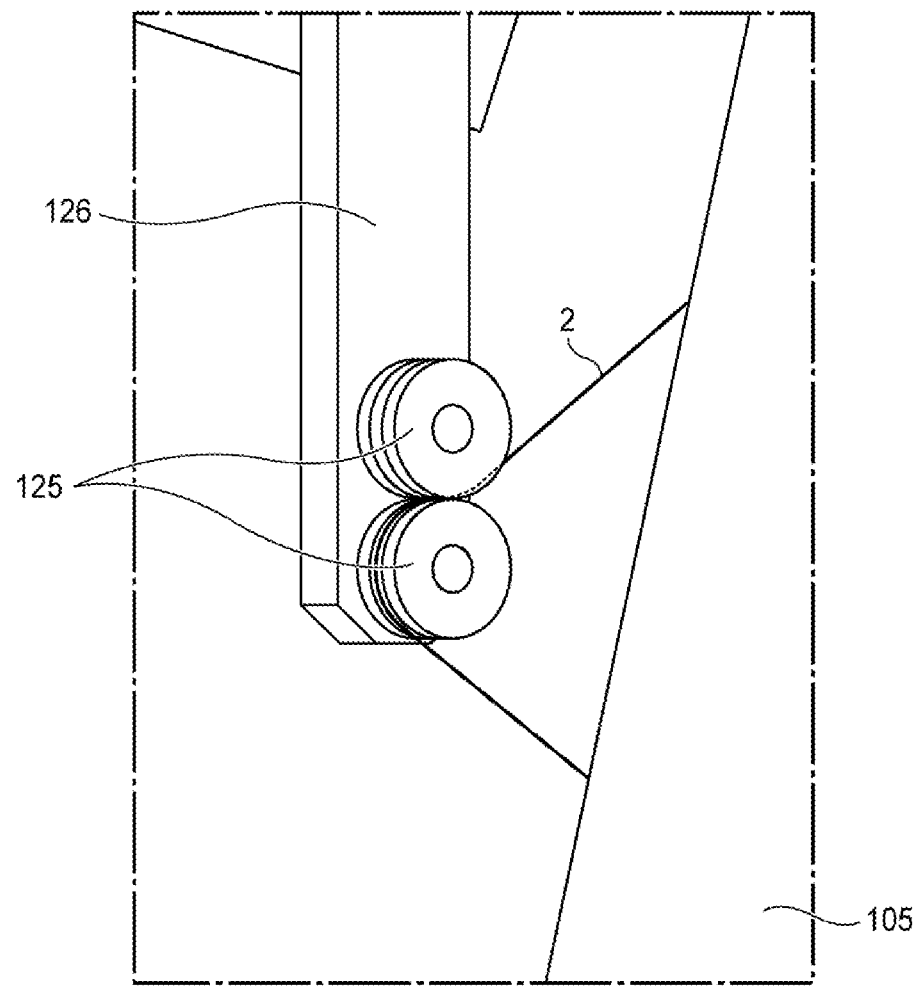
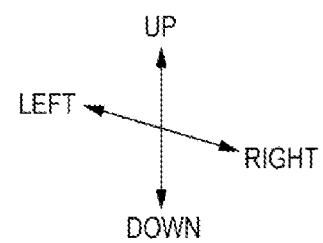

FIG. 7
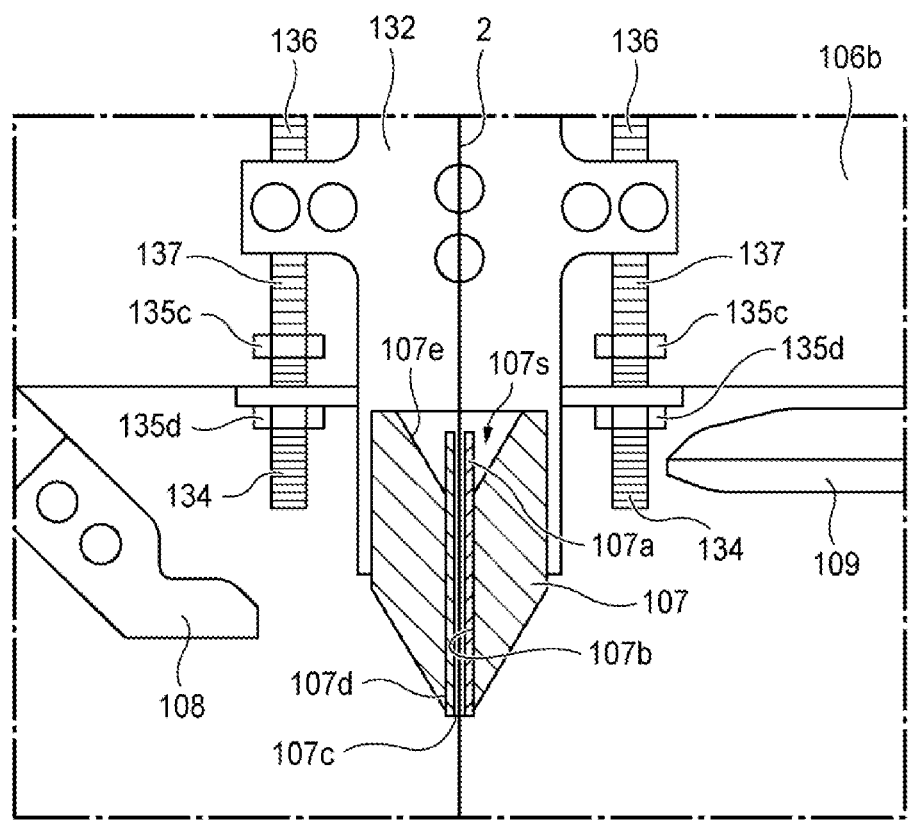
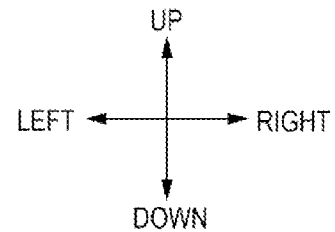

THREADLIKE ADHESIVE STICKING APPARATUS AND METHOD OF STICKING THREADLIKE ADHESIVE

CROSS REFERENCE TO RELATED APPLICATION

This application is a National Stage of International Application No. PCT/JP2021/013144, filed on Mar. 26, 2021, which designates the United States and was published in Japan, and which is based upon and claims priority to Japanese Patent Application No. 2020-064048, filed on Mar. 31, 2020 in the Japan Patent Office. All of the aforementioned applications are hereby incorporated by reference in their entireties.

TECHNICAL FIELD

The present invention relates to a threadlike adhesive sticking apparatus and a method of sticking a threadlike adhesive.

BACKGROUND ART

An adhesive body such as an adhesive sheet and an adhesive tape is used for bonding various adherends such as metal, glass, wood, paper, cardboard, and plastic material. For example, in a case of a wound form such as a roll-shaped adhesive tape, a base material of which a rear surface to be brought into contact with an adhesive surface is subjected to a releasing treatment is used in order to facilitate rewinding.

As an adhesive tape sticking apparatus, there is an apparatus in which an adhesive tape pulled out from a tip end of a holder for storing a roll-shaped adhesive tape is pressed against an adherend by a roller provided at the tip end of the holder or a peripheral wall surrounding a hole at the tip end of the holder (see Patent Literatures 1 to 4). In this sticking apparatus, the holder is moved while the roller or the peripheral wall at the tip end is brought into contact with the adherend, thereby sticking the adhesive tape to the adherend while pulling out the adhesive tape.

In addition, as an adhesive tape adhering apparatus, there is an apparatus in which a tape-shaped member with an adhesive tape adhered to a release tape is guided by a reel-shaped member and supplied onto a substrate, is pressed and stuck by a pressure head, and the peeled release tape is discharged (see Patent Literature 5). Further, there has been proposed a storage case for a threadlike adhesive obtained by attaching an adhesive to a threadlike core material (see Patent Literature 6).

CITATION LIST

Patent Literature

Patent Literature 1: JP-A-S60-44463
Patent Literature 2: JP-A-2016-74538
Patent Literature 3: JP-A-H3-119083
Patent Literature 4: Japanese Patent No. 4793608
Patent Literature 5: Japanese Patent No. 6577915
Patent Literature 6: JP-A-H3-231980

SUMMARY OF INVENTION

Technical Problem

However, in the above apparatus, when an attempt is made to use a threadlike adhesive wound around a reel without a release liner instead of the adhesive tape, the threadlike adhesive cannot be accurately and smoothly stuck for the following reason.

In the sticking apparatus or the adhering apparatus described in Patent Literatures 1 to 3 and 5, the adhesive tape having a release liner does not have a large force for rewinding the adhesive tape pulled out from the reel, and can be smoothly stuck. However, since the threadlike adhesive wound without a release liner has a strong self-adhesive force, the threadlike adhesive cannot be successfully fed out and cannot be stuck to an adherend in the apparatuses described in Patent Literatures 1 to 3 and 5.

In addition, the sticking apparatus described in Patent Literature 4 can feed out and stick an adhesive body by sticking, to an adherend, an extra length having a sufficient adhesive force to pull the adhesive body out of the reel at the time of starting the sticking. However, in the apparatus described in Patent Literature 4, an extra length longer than that in the case of a wide adhesive tape is required to feed out the threadlike adhesive, and the sticking accuracy is lowered by the extra length, so that this apparatus cannot be applied to a thin threadlike adhesive.

Further, an operator who uses the storage case described in Patent Literature 6 holds the storage case with one hand, pulls out the threadlike adhesive by a desired length with a yarn feeder held with the other hand, and presses both ends of the pulled out threadlike adhesive against an adhesive surface while pulling the both ends to stick the threadlike adhesive. That is, in Patent Literature 6, it is not assumed that the operator sticks the threadlike adhesive to a desired path while holding and moving the storage case. When an attempt is made to stick the threadlike adhesive while holding and moving the storage case, problems such as peeling, cutting, re-sticking and entanglement of the threadlike adhesive may occur due to the strength of the self-adhesion force between the threadlike adhesives wound around the reel.

The present invention has been made in view of the above-described circumstances, and an object of the present invention is to provide a threadlike adhesive sticking apparatus and a method of sticking a threadlike adhesive, by which a threadlike adhesive can be smoothly fed out and can be accurately stuck to any path.

Solution to Problem

The threadlike adhesive sticking apparatus of the present invention is a threadlike adhesive sticking apparatus that presses a threadlike adhesive wound around a winding body against an object while feeding out the threadlike adhesive, and includes an assist mechanism configured to apply an external force in a feeding direction to the threadlike adhesive fed out from the winding body, and a pressing unit configured to press the fed out threadlike adhesive against the object.

In the threadlike adhesive sticking apparatus of the present invention, for example, the assist mechanism is provided in a path for conveying the threadlike adhesive from the winding body to the pressing unit, and applies, to the threadlike adhesive, a tensile force for pulling the threadlike adhesive sandwiched therebetween in the feeding direction.

In the threadlike adhesive sticking apparatus of the present invention, for example, the assist mechanism includes a first roller and a second roller configured to sandwich the threadlike adhesive therebetween. The first roller is rotated by a driving force from a driving source or manually. The second roller is rotated in conjunction with the rotation of the first roller. The first roller and the second roller pull the threadlike adhesive sandwiched therebetween in a rotation direction.

In the threadlike adhesive sticking apparatus of the present invention, for example, the assist mechanism further includes an elastic body attached to the second roller and configured to press the second roller against the first roller.

In the threadlike adhesive sticking apparatus of the present invention, for example, the assist mechanism includes a third roller and a fourth roller configured to chuck and release the threadlike adhesive therebetween, and a fifth roller disposed between the winding body and the third and fourth rollers in the path. The fifth roller is displaceable so as to lengthen a path from the winding body to the third and fourth rollers via the fifth roller. The threadlike adhesive is fed out by the displacement of the fifth roller. The threadlike adhesive is chucked by the third and fourth rollers and supplied to the pressing unit. The pressing unit presses the threadlike adhesive against the object after the chuck of the third and fourth rollers is released.

In the threadlike adhesive sticking apparatus of the present invention, for example, the assist mechanism applies, to the threadlike adhesive, an extrusion force for feeding out the threadlike adhesive by rotating the winding body in the feeding direction.

In the threadlike adhesive sticking apparatus of the present invention, for example, the assist mechanism comes into contact with the threadlike adhesive wound around the winding body or an outer peripheral surface of the winding body to rotate the winding body in the feeding direction.

In the threadlike adhesive sticking apparatus of the present invention, for example, a member that applies tension to the threadlike adhesive is not provided in a path for conveying the threadlike adhesive between the assist mechanism and the pressing unit.

The threadlike adhesive sticking apparatus of the present invention further includes, for example, a nozzle having an inner wall surface defining a cylindrical internal space and a tip end having a tip end opening at one end of the inner wall surface, the tip end opening allowing the internal space to communicate with the outside. The pressing unit presses the threadlike adhesive, which has been allowed to pass through the internal space and has been led out to the outside from the tip end opening, against the object. A plurality of portions of a peripheral portion surrounding the tip end opening at the tip end function as the pressing unit.

The threadlike adhesive sticking apparatus of the present invention further includes, for example, a nozzle displacement unit attached to the nozzle and configured to displace the nozzle by being displaced in a pressing direction, and an absorption mechanism configured to absorb a displacement of the nozzle with respect to a displacement of the nozzle displacement unit in the pressing direction.

A method of sticking a threadlike adhesive of the present invention includes sticking the threadlike adhesive to the object by using the threadlike adhesive sticking apparatus of the present invention.

Advantageous Effects of Invention

According to the present invention, it is possible to smoothly pull out the threadlike adhesive and to accurately stick the threadlike adhesive to any path.

BRIEF DESCRIPTION OF DRAWINGS

FIG. 2 is a view (1) showing a specific example of a conveyance path of a threadlike adhesive in the threadlike adhesive sticking apparatus of the first embodiment.

FIG. 3 is a view (2) showing a specific example of the conveyance path of the threadlike adhesive in the threadlike adhesive sticking apparatus of the first embodiment.

FIG. 4 is a view (3) showing a specific example of the conveyance path of the threadlike adhesive in the threadlike adhesive sticking apparatus of the first embodiment.

FIG. 7 is a view showing a cut surface of the nozzle.

FIG. 19A and FIG. 19B are views showing an example of a cross-sectional shape of a tip end portion viewed from a tip end opening side, in which FIG. 19A is a view showing a tip end portion having a circular cross-section, and FIG. 19B is a view showing a tip end portion having a rectangular cross-section.

DESCRIPTION OF EMBODIMENTS

Hereinafter, threadlike adhesive sticking apparatuses according to preferred embodiments of the present invention will be described in detail with reference to the drawings.

First Embodiment

Figure 1:
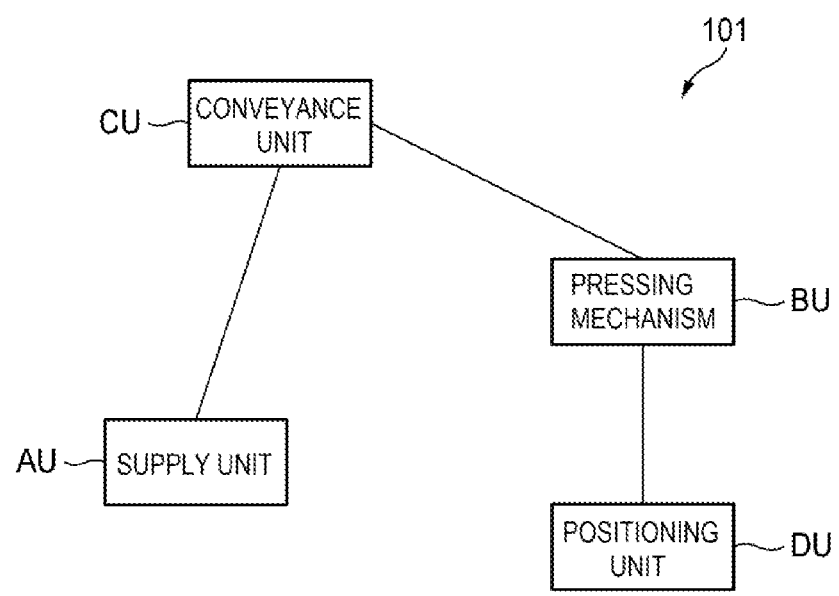
FIG. 1 is a view conceptually showing a configuration of a threadlike adhesive sticking apparatus according to a first embodiment of the present invention.
Figure 5:
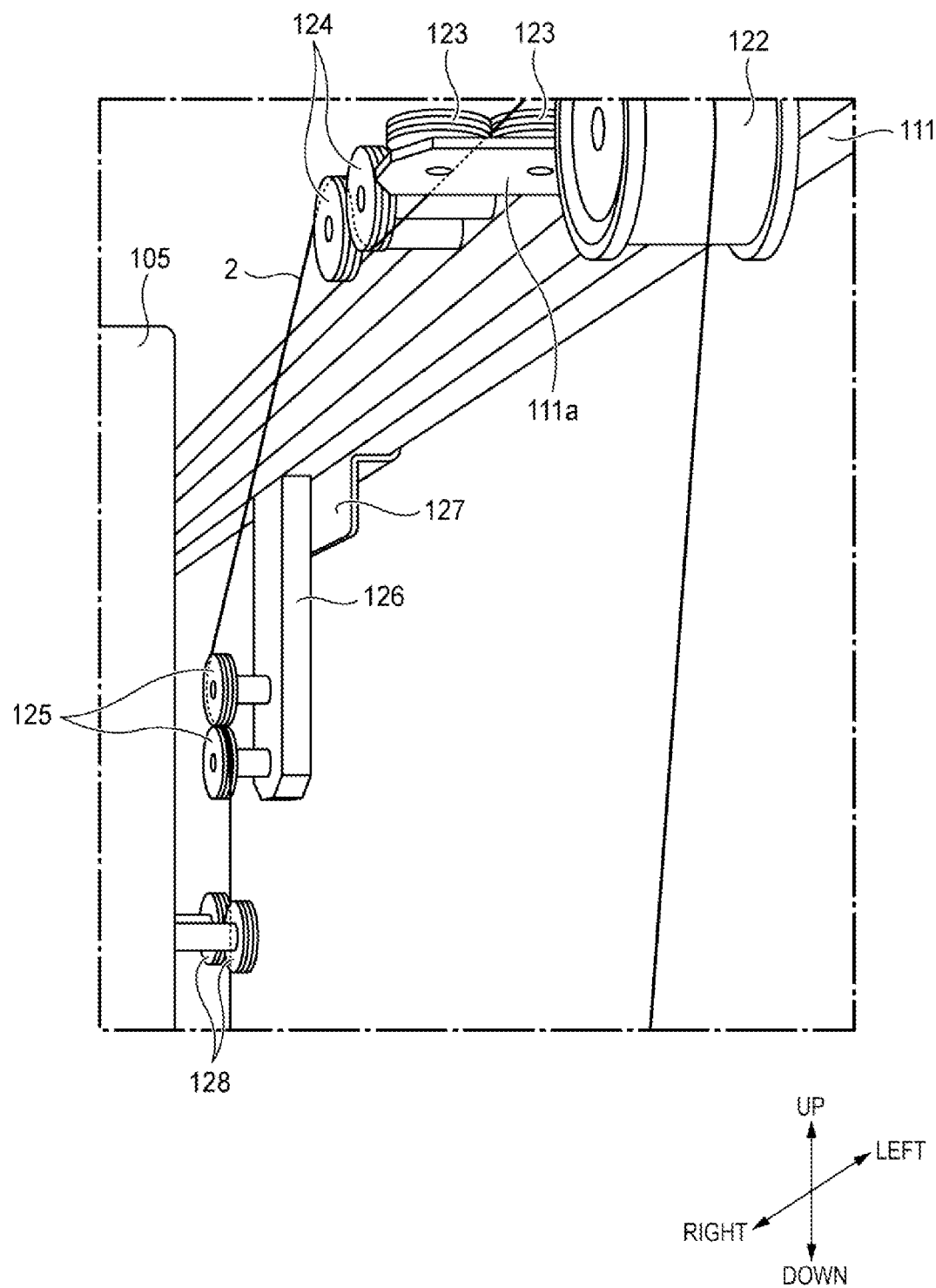
FIG. 5 is a view (4) showing a specific example of the conveyance path of the threadlike adhesive in the threadlike adhesive sticking apparatus of the first embodiment.

FIG. 1 is a view conceptually showing a configuration of a threadlike adhesive sticking apparatus according to a first embodiment of the present invention. FIGS. 2 to 5 are views showing specific examples of a conveyance path of a threadlike adhesive in the threadlike adhesive sticking apparatus according to the first embodiment. FIG. 2 and FIG. 4 are views showing the threadlike adhesive sticking apparatus as viewed from a rear side. FIG. 3 and FIG. 5 are views showing the threadlike adhesive sticking apparatus as viewed from a left side. Arrows shown in FIG. 2 to FIG. 8 indicate front-rear, left-right, and up-down directions of the threadlike adhesive sticking apparatus. The front-rear direction is also referred to as an X-axis direction, the left-right direction (width direction) is also referred to as a Y-axis direction, and the up-down direction (height direction) is also referred to as a Z-axis direction.

A threadlike adhesive sticking apparatus 101 is an apparatus that presses and sticks a threadlike adhesive 2 to an object (adherend). The threadlike adhesive sticking apparatus 101 mainly includes a supply unit AU, a pressing mechanism BU (nozzle), a conveyance unit CU, and a positioning unit DU as shown in FIG. 1. The supply unit AU supplies the threadlike adhesive 2 wound in a roll shape. The pressing mechanism BU presses the supplied threadlike adhesive 2 against the adherend. The conveyance unit CU conveys the threadlike adhesive 2 from the supply unit AU to the pressing mechanism BU. The positioning unit DU positions the pressing mechanism BU relative to the object.

(Positioning Unit DU)

The threadlike adhesive sticking apparatus 101 includes a table disposed on a base and a stage that is slidable on the table along the X-axis direction (front-rear direction), as a part constituting an example of the positioning unit DU. The object is placed on an upper surface of the stage and mounted by suction or the like. When the stage is moved in the X-axis direction by a driving unit, the object is moved in the X-axis direction. In addition, the threadlike adhesive sticking apparatus 101 includes, for example, a pair of support columns erected on left and right sides of the table, and a horizontal arm installed between the pair of support columns along the Y-axis direction (left-right direction) above the pair of support columns.

A horizontal moving unit 105 (see FIG. 5) that is slidable along the Y-axis direction is attached to the horizontal arm. The horizontal moving unit 105 is moved in the Y-axis direction by a driving unit (not shown). The horizontal moving unit 105 has a substantially rectangular parallelepiped shape, and a lifting body (not shown) provided below is slidably held in the Z-axis direction (up-down direction). A nozzle 107 is attached to the lifting body via an attachment plate 106. That is, in the horizontal moving unit 105, the nozzle 107 is moved in the Z-axis direction by a driving unit (not shown). Details of the nozzle 107 will be described later.

In the threadlike adhesive sticking apparatus 101, the nozzle 107 can be positioned relative to the object in an XY plane by the stage and the horizontal moving unit 105, and the nozzle 107 can be moved in the Z-axis direction by raising and lowering the lifting body of the horizontal moving unit 105. That is, the stage and the horizontal moving unit 105 function as the positioning unit DU.

(Supply Unit AU)

The threadlike adhesive sticking apparatus 101 includes a winding body and a winding body holding unit as an example of the supply unit AU. The winding body has a cylindrical shape such as a reel, a paper tube, and a bobbin. The threadlike adhesive 2 obtained by attaching an adhesive to a threadlike core material is wound around an outer peripheral surface of the winding body. The winding body can be formed of a metal, a resin, an easily releasable material, or the like. The winding body holding unit holds the winding body such that movement of the winding body in the front-rear direction is restricted in the vicinity of both ends of the winding body around which the threadlike adhesive 2 is wound, and the winding body is rotatable as the threadlike adhesive 2 is conveyed (fed out). The threadlike adhesive 2 is an adhesive body obtained by covering a surface of a threadlike core material with an adhesive layer. Details of the threadlike adhesive 2 will be described later.

The threadlike adhesive sticking apparatus 101 can supply the threadlike adhesive 2 wound in a roll shape by the winding body and the winding body holding unit. That is, the winding body and the winding body holding unit function as the supply unit AU.

(Conveyance Unit CU)

The threadlike adhesive sticking apparatus 101 includes a roller 122 and each pair of rollers 123, 124, 125, and 128 as an example of the conveyance unit CU, and conveys the threadlike adhesive 2 fed out from the supply unit AU (winding body) to the nozzle 107. In the roller 122 and each pair of rollers 123, 124, 125, and 128, at least the outer peripheral surface (rotating surface) in contact with the threadlike adhesive 2 is a non-adhesive surface. That is, at least the outer peripheral surface of each roller in contact with the threadlike adhesive 2 is formed of, for example, at least one of a fluorine resin, a silicone resin, and a polyolefin resin. Alternatively, at least the outer peripheral surface of each roller in contact with the threadlike adhesive 2 is subjected to a non-adhesive treatment by, for example, at least one of fluorine coating, silicone coating, long-chain alkyl coating, and Tosical (registered trademark) coating. The treatment by fluorine coating includes a treatment by a fluorine resin heat-shrinkable tube and a fluorine resin fabric sheet. Alternatively, at least the outer peripheral surface of each roller in contact with the threadlike adhesive 2 may be subjected to various non-adhesive treatments on the base material. For example, the base material may be uneven by blasting, and concave portions may be coated with a non-adhesive substance, or the base material may be treated with PEEK (polyether ether ketone) coating, fluorine composite electroless nickel plating (in which fine particles of a fluorine resin are dispersed and co-deposited in a film of electroless nickel plating), Biceram (fluorine resin coating containing micronized ceramic particles), fiber reinforced plastics (FRP) lining, ultrahigh molecular polyester (PE) lining, or the like.

The roller 122 and each pair of rollers 123 and 124 are attached to a rear side of a frame 111. The frame 111 is installed, along the Y-axis direction, between a pair of frames erected on a left side of the winding body holding unit 121 and a right side of the table, on the base.

The roller 122 is rotatably attached to a rectangular attachment portion 111a extending downward in the vicinity of a left end portion of the frame 111, in a perpendicular plane (YZ plane). As shown in FIG. 3, the roller 122 preferably has a bobbin shape having flanges at both ends. When the threadlike adhesive 2 is fed out from the winding body, the threadlike adhesive 2 is moved in a width direction of the body of the roller 122, and the threadlike adhesive 2 is less likely to fall off from the roller 122 due to the flanges at both ends. The pair of rollers 123 is rotatably attached to a rectangular attachment portion 111b extending in the front-rear direction on a right side of the attachment portion 111a on the frame 111, in a horizontal plane (XY plane). On the attachment portion 1/1b, the pair of rollers 123 is disposed adjacent to the front and rear so as to be separated from each other so that the threadlike adhesive 2 can be allowed to pass therebetween while being guided by the rotating surfaces of the pair of rollers 123 (see FIG. 3). The threadlike adhesive 2, which has been fed upward from the winding body and has been allowed to pass through the rotating surfaces (outer peripheral surfaces) of the roller 122 on the left side and the upper side as shown in FIG. 2, is allowed to pass between the pair of rollers 123 and reaches the pair of rollers 124 as shown in FIG. 3.

The pair of rollers 124 is rotatably attached in the perpendicular plane on the right side of the pair of rollers 123 on the frame 111. The pair of rollers 124 are disposed adjacent to the left and right so as to be separated from each other so that the threadlike adhesive 2 can be allowed to pass therebetween while being guided by the rotating surfaces of the pair of rollers 124 (see FIG. 2 and FIG. 3). As shown in FIG. 3, the threadlike adhesive 2, which has been allowed to pass between the pair of rollers 123, is allowed to pass through the upper rotating surface of the right roller 124 from the lower rotating surface of the left roller 124, and reaches the pair of rollers 125. The pair of rollers 123 and the pair of rollers 124 can prevent meandering of the threadlike adhesive 2 fed out from the winding body, but these are not necessarily required, and the rollers 123 and 124 may not be provided.

The pair of rollers 125 is rotatably attached to a lower side of an oil damper 126 extending substantially in the Z-axis direction, in the perpendicular plane. An upper end portion of the oil damper 126 is rotatably fixed to a damper attachment portion having a substantially rectangular shape, in the perpendicular plane. The damper attachment portion protrudes downward substantially at the center of the frame 111 in the Y-axis direction. The pair of rollers 125 is disposed adjacent to each other along an extending direction of the oil damper so as to be separated from each other so that the threadlike adhesive 2 can be allowed to pass therebetween while being guided by the rotating surfaces of the pair of rollers 125 (see FIG. 4). As shown in FIG. 5, the threadlike adhesive 2, which has been allowed to pass between the pair of rollers 124, is allowed to pass through the right and lower rotating surfaces of the upper roller 125, is allowed to pass through the upper and left rotating surfaces of the lower roller 125, and reaches a pair of rollers 128. The threadlike adhesive 2 guided by the pair of rollers 125 is prevented from sagging by a lower part of the oil damper 126 swinging slowly to the left and right. The pair of rollers 125 and the oil damper 126 may not be provided. This is because, by changing a location where the winding body is placed or a moving speed of the positioning unit DU, the sagging of the threadlike adhesive 2 does not occur, and the function of preventing the sagging by the pair of rollers 125 and the oil damper 126 becomes unnecessary.

Figure 6:
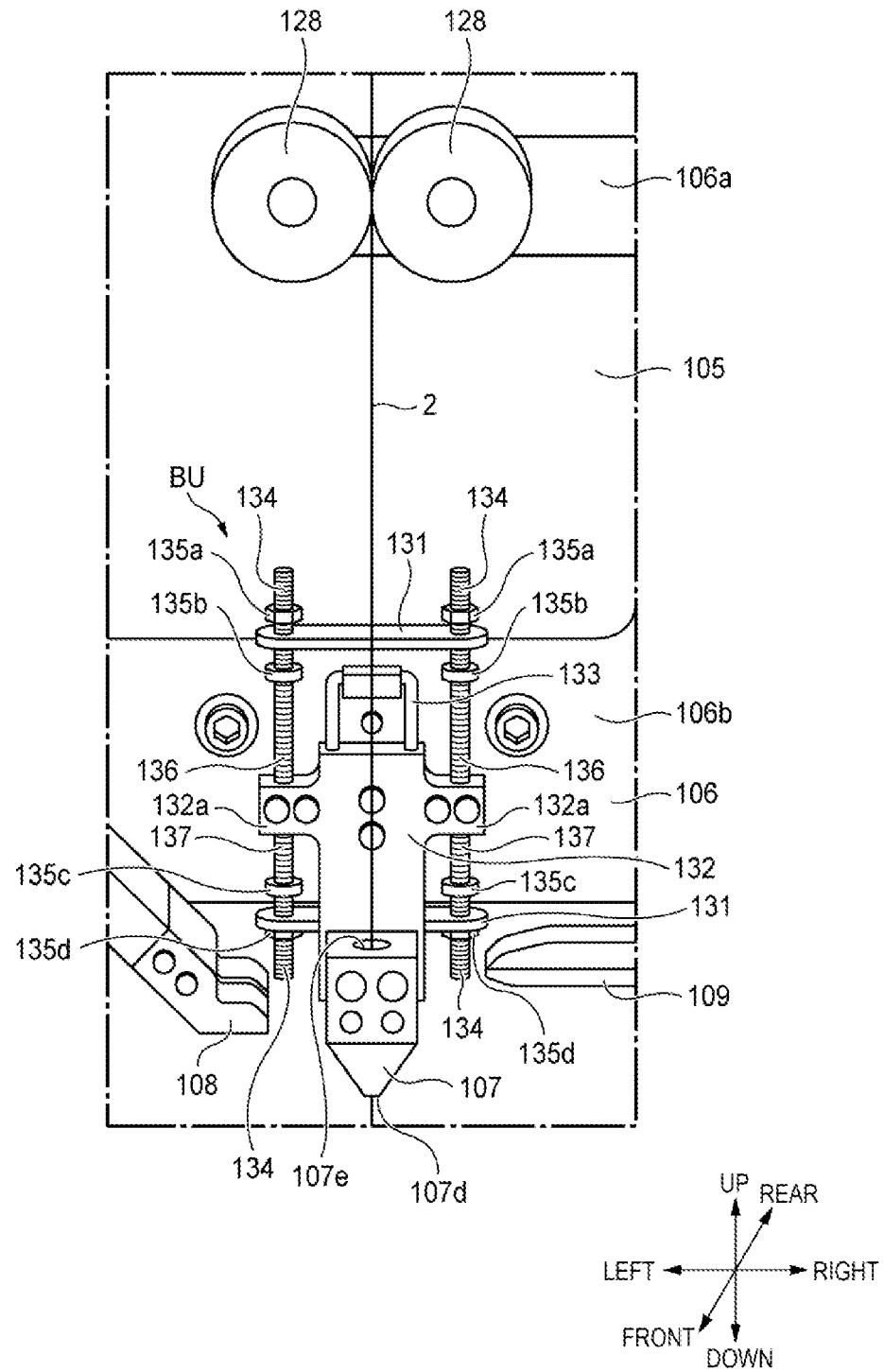
FIG. 6 is a view showing a periphery of a nozzle in the threadlike adhesive sticking apparatus of the first embodiment.

The pair of rollers 128 is rotatably attached to a roller attachment portion 106a of the attachment plate 106 disposed on a front of the horizontal moving unit 105, in the perpendicular plane. The pair of rollers 128 is disposed adjacent to the left and right so as to be separated from each other so that the threadlike adhesive 2 can be allowed to pass therebetween while being guided by the rotating surfaces of the pair of rollers 128. As shown in FIG. 6, the threadlike adhesive 2 which has been allowed to pass between the pair of rollers 125, is allowed to pass between the pair of rollers 128 and reaches the nozzle 107. Since the pair of rollers 128 is provided directly above the nozzle 107 attached to the attachment plate 106, the threadlike adhesive 2 is guided by the pair of rollers 128 and enters straight into a cylindrical internal space 107s (see FIG. 7) of the nozzle 107 regardless of the position of the nozzle 107. The pair of rollers 128 may be disposed adjacent up and down and guide the threadlike adhesive 2 to the position of the nozzle 107 by passing the threadlike adhesive 2 in an S-shape, or may guide the threadlike adhesive 2 to the position of the nozzle 107 by another configuration.

The threadlike adhesive sticking apparatus 101 conveys the threadlike adhesive 2 from the supply unit AU to the pressing mechanism BU by the roller 122 and each pair of rollers 123, 124, 125, and 128. That is, the roller 122 and each pair of rollers 123, 124, 125, and 128 function as the conveyance unit CU. The conveyance unit CU may convey the threadlike adhesive 2 to a unit other than the pressing mechanism BU, for example, a pressing unit that presses the threadlike adhesive 2 against the adherend with a roller.

(Pressing Mechanism BU)

Figure 8:
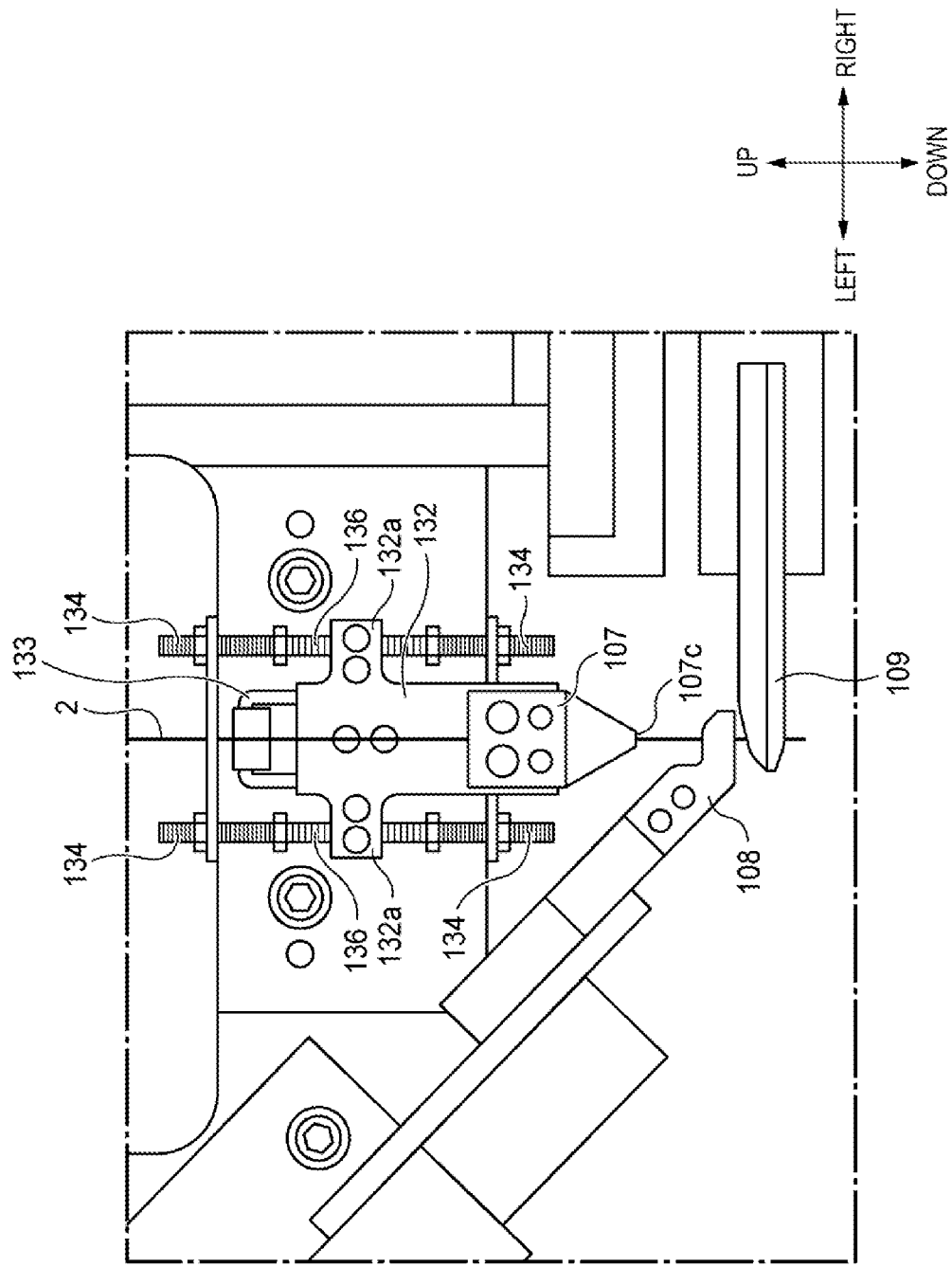
FIG. 8 is a view showing a periphery of the nozzle when the threadlike adhesive is cut.

An example of the pressing mechanism BU provided on the threadlike adhesive sticking apparatus 101 will be described with reference to FIGS. 6 to 8. FIGS. 6 to 8 are views showing the periphery of the nozzle 107 of the threadlike adhesive sticking apparatus 101. FIG. 6 is a perspective view showing the periphery of the nozzle 107 as viewed from a front upper side. FIG. 7 is a view including a cross-section of the nozzle 107 in the YZ plane along the threadlike adhesive 2. FIG. 8 is a view showing a state of cutting the threadlike adhesive 2.

The threadlike adhesive sticking apparatus 101 includes the attachment plate 106 and the nozzle 107 as a part constituting an example of the pressing mechanism BU. The attachment plate 106 is slidably attached in the Z-axis direction with respect to the horizontal moving unit 105 on the front side of the horizontal moving unit 105. The attachment plate 106 is a thin metal flat plate formed in a substantially U shape, and includes the roller attachment portion 106a, a nozzle attachment portion 106b (nozzle displacement unit), and a substantially rectangular connection portion elongated in the Z direction. The roller attachment portion 106a is a substantially rectangular portion extending in the Y-axis direction above the connection portion. The pair of rollers 128 are attached to the front side of the roller attachment portion 106a. The nozzle attachment portion 106b is a substantially rectangular portion extending in the Y direction below the connection portion. The nozzle 107, an air chuck 108, and an air scissor 109 are attached to the front side of the nozzle attachment portion 106b.

The nozzle 107 is a member formed of aluminum or the like and having a shape obtained by connecting a bottom surface of a cone to a lower surface of a cube. The nozzle 107 has an inner wall surface 107b that defines the cylindrical internal space 107s extending in the up-down direction, and a tip end 107d having a tip end opening 107c at a lower end portion of the inner wall surface 107b, the tip end opening 107c allowing the cylindrical internal space 107s to communicate with the outside. The nozzle 107 is a member formed of metal or the like, and the surface of the nozzle 107 including the inner wall surface 107b and the tip end 107d is subjected to a slidability improving process. The nozzle 107 has an insertion-side opening 107e at the upper end portion of the inner wall surface 107b, the insertion-side opening 107e allowing the cylindrical internal space 107s to communicate with the outside. The inner wall surface 107b is formed such that the cylindrical internal space 107s has a funnel shape in which a cylinder having the same diameter as the tip end opening 107c extends upward from the tip end opening 107c and gradually increases in diameter. The insertion-side opening 107e has a funnel shape whose diameter is larger than that of the tip end opening 107c. Note that the inner wall surface 107b needs only to define a cylindrical internal space, and for example, an upper portion of the inner wall surface 107b may be formed as a cylinder or the like having the same diameter instead of a funnel shape.

In the cylindrical internal space 107s of the nozzle 107, a tube 107a formed of a hardly adhesive resin such as polytetrafluoroethylene (PTFE) and having a hollow cylindrical shape from the upper end to below the lower end (tip end 107d) of the nozzle 107 may be provided. Alternatively, a surface treatment for improving slidability may be performed. A diameter of the threadlike adhesive 2 is preferably, for example, 0.45 mm with respect to a diameter of the lower side opening of, for example, about 1 mm in the tube 107a. That is, a cross-sectional area of the lower side opening of the tube 107a is preferably about 4.9 times a cross-sectional area of the threadlike adhesive 2. The tube 107a protrudes slightly (for example, about 0.5 to 1 mm) from the lower end of the inner wall surface 107b. By inserting the threadlike adhesive 2 into the tube 107a, the slidability (feedability) of the threadlike adhesive 2 is improved. Since the insertion-side opening 107e is enlarged in diameter, it is easy to insert the threadlike adhesive 2 into the nozzle 107. In addition, when the material of the nozzle 107 itself is a hardly adhesive resin such as PTFE, it is possible to prevent the threadlike adhesive 2 from adhering to the nozzle 107. As a result, the threadlike adhesive 2 can be smoothly fed out from the nozzle 107 without being caught, and thus the tube 107a is unnecessary. Further, a shape of the nozzle 107 is not limited as long as the nozzle 107 has a cylindrical internal space and a tip end having a tip end opening through which the internal space communicates with the outside. In addition, in the nozzle 107, a shape of the tip end opening 107c (or a lower side opening of the tube 107a) is preferably a circular shape or a polygonal shape having five or more corners.

The nozzle 107 presses the threadlike adhesive 2, which has been allowed to pass through the tube 107a (cylindrical internal space 107s) and has been led out to the outside from the lower side opening (tip end opening 107c) of the tube 107a, against the object. More specifically, an entire circumference or a plurality of any positions of the lower end portion of the tube 107a which is the peripheral portion surrounding the tip end opening 107c of the nozzle 107 function as the pressing unit that presses the threadlike adhesive 2 against the object. Therefore, it is possible to stick the threadlike adhesive while moving the nozzle 107 in a plurality of any directions without using a roller or the like as the pressing unit. Therefore, in a case where the adhesive is pressed by the roller, it is possible to prevent a problem that the adhesion accuracy is poor due to the movement of the adhesive within a roller width, and the adhesive is detached from the roller depending on an adhesion path, and thus it is possible to accurately stick the threadlike adhesive.

(Relationship Between Hole Diameter of Nozzle 107 and Diameter of Threadlike Adhesive 2)

A hole diameter of the nozzle 107 (diameter on an inner side (inner diameter), a hole diameter of the tube 107a in the case where the tube 107a is provided) is preferably 0.7 mm to 1 mm in diameter in the case where the threadlike adhesive 2 has a diameter of 0.45 mm (a width of 0.6 mm in compression of about 0.3 MPa). When the hole diameter of the nozzle 107 is smaller than 0.7 mm, an area of the threadlike adhesive 2 in contact with the inside of the nozzle 107 becomes large, and thus the threadlike adhesive 2 does not stick to the adherend. On the other hand, when the hole diameter of the nozzle 107 exceeds 1 mm and is too large, the threadlike adhesive 2 is moved inside the nozzle 107, and thus a sticking speed does not increase and the sticking accuracy deteriorates. Therefore, a ratio of the diameter of the threadlike adhesive 2 to the hole diameter of the nozzle 107 is preferably 0.45:0.7 to 1.

In addition, the nozzle 107 presses the threadlike adhesive 2 against the object while the lower side opening (or the tip end opening 107c) of the tube 107a comes into contact with and slides on the adhesive surface of the threadlike adhesive 2. Specifically, the tip end 107d of the nozzle 107 (or the tip end of the tube 107a, at least a portion in contact with the adhesive surface) may be formed of at least one of a fluorine resin, a silicone resin, or a polyolefin resin. Alternatively, the tip end 107d of the nozzle 107 (or the tip end of the tube 107a, at least a portion in contact with the adhesive surface) is treated by at least one of fluorine coating, silicone coating, or long-chain alkyl coating. Alternatively, various slidability improving processes described below are performed. The treatment by fluorine coating includes a treatment by a fluorine resin heat-shrinkable tube and a fluorine resin fabric sheet.

The tip end portion of the nozzle 107 may be subjected to various slidability improving processes on the base material. For example, the base material may be treated with PEEK (polyether ether ketone) coating, fluorine composite electroless nickel plating (in which fine particles of a fluorine resin are dispersed and co-deposited in a film of electroless nickel plating), Biceram (fluorine resin coating containing micronized ceramic particles), fiber reinforced plastics (FRP) lining, ultrahigh molecular polyester (PE) lining, or the like. As a result, the threadlike adhesive 2 can be smoothly stuck to the object.

When the nozzle 107 in contact with the adhesive surface of the threadlike adhesive 2 is not hardly adhesive, it is preferable that a dynamic friction force between the tip end 107d coated/treated for improving slidability and the adhesive surface is 3 N/mm or less. In a case where the tube 107a, which is formed of a hardly adhesive resin, is inserted into the nozzle 107, it is preferable that a dynamic friction force between the lower side opening of the tube 107a and the adhesive surface of the threadlike adhesive 2 is 3 N/mm or less. When the nozzle 107 itself is formed of a hardly adhesive resin such as PTFE (silicone, olefin, etc.), a dynamic friction force between the tip end opening 107c and the adhesive surface of the threadlike adhesive 2 is preferably 3 N/mm or less.

In this way, due to a shape of the tip end portion of the nozzle 107 (details will be described later) and a material/surface treatment, the tip end portion of the nozzle 107 in contact with the adhesive surface of the threadlike adhesive 2 has a low frictional force with respect to the adhesive surface. In addition, since the tip end portion of the nozzle 107 is formed of a material with reduced unevenness or is subjected to a surface treatment, it is possible to inhibit occurrence of scraping or the like when the soft threadlike adhesive 2 slides thereon. Therefore, the threadlike adhesive 2 can be smoothly stuck. The dynamic friction force between the tip end portion of the nozzle 107 and the adhesive surface of the threadlike adhesive 2 can be measured by the following method.

Figure 9:
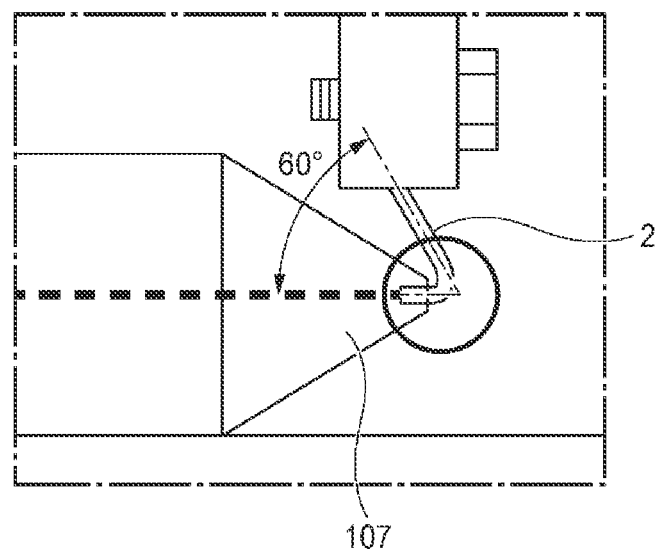
FIG. 9 is a view showing a method of measuring a dynamic friction force between a tip end portion of the nozzle and an adhesive surface of the threadlike adhesive.

As shown in FIG. 9, the nozzle 107 is placed on a horizontal plane so that the cylindrical internal space 107s extends in the horizontal direction, and the threadlike adhesive 2 inserted from the insertion-side opening 107e is pulled out from the tip end opening 107c. The threadlike adhesive 2 is set so that an angle formed by the threadlike adhesive 2 which has been allowed to pass through the cylindrical internal space 107s and the threadlike adhesive 2 pulled out from the tip end opening 107c is 60 degrees. By setting in this manner, the threadlike adhesive 2 reliably comes into contact with the tip end portion of the nozzle 107. On an insertion-side opening 107e side, tension is applied to the threadlike adhesive 2 with a weight of 10 g. In this state, the threadlike adhesive 2 pulled out from the tip end opening 107c is pulled upward in the vertical direction at 1 mm/sec, and a stress (value at the time of stabilization) is measured. At this time, a width (thickness) of the threadlike adhesive 2 that has pressed against the nozzle tip end indicated by a circle in FIG. 9 is, for example, 0.4 mm. A value obtained by dividing a value of a stress when the threadlike adhesive 2 is being moved in this way by the width of the threadlike adhesive 2 is defined as the dynamic friction force.

Since the tip end portion of the nozzle 107 in the present embodiment has a dynamic friction force of 3 N/mm or less with respect to the adhesive surface of the threadlike adhesive 2, the threadlike adhesive 2 can be smoothly stuck. In addition, the dynamic friction force between the tip end portion of the nozzle 107 and the adhesive surface of the threadlike adhesive 2 is preferably 1 N/mm or less. The dynamic friction force between the tip end portion of the nozzle and the adhesive surface of the threadlike adhesive 2 is 3 N/mm or less not limited in the case where the width (thickness) of the threadlike adhesive 2 that has pressed against the nozzle tip end is 0.4 mm, and also in the case where the width (thickness) of the threadlike adhesive 2 that has pressed against the nozzle tip end is 0.2 mm to 0.45 mm or other sizes.

Furthermore, when the shape of the tip end opening 107c (or the lower side opening of the tube 107a) is a circular shape or a polygonal shape having five or more corners, the nozzle 107 can easily change a sticking direction.

Figure 10A:
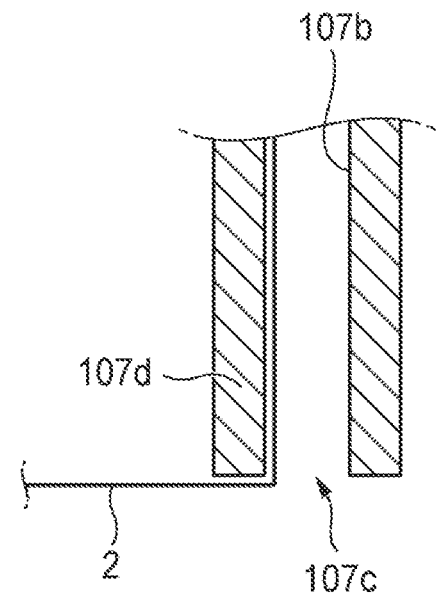
FIG. 10A and FIG. 10B are enlarged cross-sectional views of a nozzle tip end.
Figure 10B:
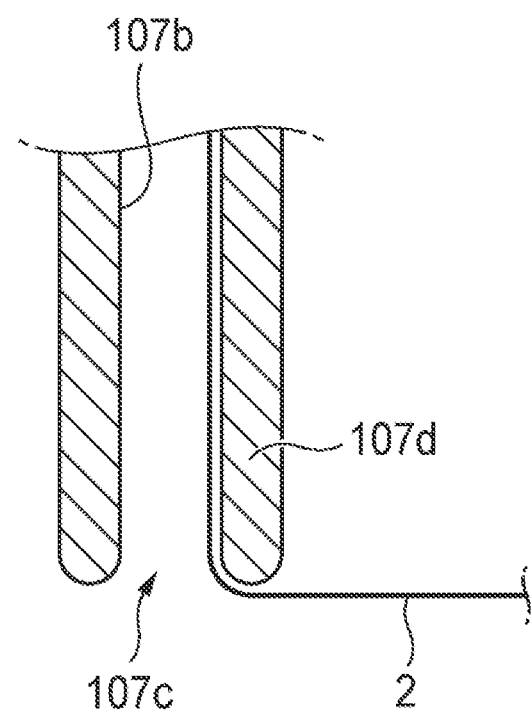

FIG. 10A and FIG. 10B are enlarged cross-sectional views of the tip end 107d of the nozzle 107, and shows an example of the nozzle 107 having a shape different from that described above. The nozzle 107 may be formed of a hardly adhesive resin such as fluorine, or may be a nozzle which is formed of a metal and whose surface has been subjected to a slidability improving process. In FIG. 10A, since the tip end 107d has a corner, the threadlike adhesive 2 may be caught, displaced, or cut. In FIG. 10B, since the tip end 107d is round, that is, the portion pressing the threadlike adhesive 2 is a curved surface, the threadlike adhesive 2 is not caught and can be favorably stuck. When the nozzle 107 shown in FIG. 10B is formed of a resin such as fluorine, the nozzle 107 may be protected by passing the nozzle 107 through a guide formed of stainless steel (SUS).

The nozzle 107 is configured to be movable in the up-down direction and include an absorption mechanism that absorbs a displacement of the nozzle 107 with respect to a displacement of a base to which the nozzle 107 is attached in the up-down direction. Hereinafter, an example of this configuration will be described, but the configuration related to the displacement of the nozzle is not limited to the following configuration. The nozzle 107 is fixed to a slider 132 movable in the up-down direction along a slide rail 133. The slider 132 has a substantially rectangular parallelepiped shape, with portions of the left and right side surfaces having bulging portions 132a respectively protruding to the left and right sides.

The slide rail 133 is attached to the front of the nozzle attachment portion 106b along the up-down direction. Two bolts 134 and springs 136 and 137 disposed between the two bolts 134 are respectively provided on the left and right sides of the slide rail 133 along the up-down direction. The bolts 134 are inserted through the left and right end portions of horizontally long bolt insertion portions 131 in the up-down direction. The bolt insertion portion 131 extends forward from an upper side and a lower side of the nozzle attachment portion 106b, separately. Nuts 135a and 135b are respectively disposed on left and right sides above and below the upper bolt insertion portion 131, and are screwed to the bolts 134. Nuts 135c and 135d are respectively disposed on the left and right sides above and below the lower bolt insertion portion 131, and are screwed to the bolts 134.

The spring 136 is disposed between the nut 135b and the upper portion of the bulging portion 132a, and the spring 137 is disposed between the lower portion of the bulging portion 132a and the nut 135c. A lower end portion of the upper bolt 134 is inserted into an upper side of the spring 136, and a lower side of the spring 136 is fixed to the bulging portion 132a, thereby preventing the spring 136 from being detached. The upper side of the spring 137 is fixed to the bulging portion 132a, and the upper end portion of the lower bolt 134 is inserted into the lower side of the spring 137, thereby preventing the spring 137 from being detached.

The nozzle 107 is fixed to the slider 132, and the nozzle 107 is displaced in accordance with the displacement of the slider 132 in the up-down direction. Specifically, as the lifting body of the horizontal moving unit 105 is raised and lowered (displaced), the nozzle attachment portion 106b fixed to the lifting body is raised and lowered (displaced). Here, the slider 132 slidably attached to the nozzle attachment portion 106b does not slide, and a position of the slider 132 on the nozzle attachment portion 106b does not change in a state where the springs 136 and 137 are attached up and down and no load is applied to the nozzle 107. On the other hand, when the nozzle 107 is pressed against the object via the threadlike adhesive 2, an elastic force in a direction opposite to the pressing direction is generated in the springs 136 and 137. That is, the springs 136 and 137 absorb the displacement of the nozzle 107 with respect to the displacement of the nozzle attachment portion 106b. As a result, it is possible to control a force (pressing force) with which the nozzle 107 presses the threadlike adhesive 2 against the object, and to prevent the pressing force from excessively increasing or rapidly increasing. Therefore, it is possible to prevent a large deformation of the threadlike adhesive 2, that is, a problem such as sticking out of the adhesive (lowering of adhesion width accuracy) or unevenness of the height of the threadlike adhesive 2 due to an excessively strong pressing force, and to appropriately express the adhesive force of the threadlike adhesive. In addition, it is possible to protect the apparatus by preventing an excessive load from being applied to the nozzle 107.

In this way, the springs 136 and 137 function as an absorption mechanism that absorbs the displacement of the nozzle 107 with respect to the displacement of the nozzle attachment portion 106b, and gently change the pressing force. Therefore, even in a case where a height of an adhesive surface of the object changes depending on the accuracy or in a case where the adhesive surface of the object is not smooth and has unevenness, the above-described problem can be prevented. In addition, even in a portion where the threadlike adhesive 2 overlaps in the sticking path, the threadlike adhesive 2 can be smoothly stuck over the stuck threadlike adhesive 2 by the function of the springs 136 and 137. Instead of the springs 136 and 137, an oil damper or an air cylinder may be attached between the nozzle attachment portion 106b and the nozzle 107 to function as an absorption mechanism. The pressing mechanism BU described above is merely an example. The pressing mechanism BU may have another configuration such that the nozzle 107 is movable in the up-down direction, and includes an absorption mechanism that absorbs the displacement of the nozzle 107 with respect to the displacement of the base to which the nozzle 107 is attached in the up-down direction.

The air chuck 108 and the air scissor 109 are attached to the nozzle attachment portion 106b on the left and right sides of the nozzle 107, respectively (see FIG. 6 and FIG. 7). When the sticking of the threadlike adhesive 2 is completed, the air chuck 108 and the air scissor 109 are separately moved from a normal position shown in FIG. 6 and FIG. 7 to a position shown in FIG. 8 by a driving unit. The air chuck 108 is moved obliquely from the normal position to the lower right, and chucks the threadlike adhesive 2 immediately below the nozzle 107. The air scissor 109 is moved downward from the normal position and then moved leftward to cut the chucked threadlike adhesive 2 immediately below the air chuck 108. Since the air chuck 108 and the air scissor 109 are attached to the lifting body of the horizontal moving unit 105 via the attachment plate 106 similarly to the nozzle 107, the air chuck 108 and the air scissor 109 can be moved together with the nozzle 107 while maintaining the positional relationship with respect to the nozzle 107. The air chuck 108 and the air scissor 109 are not limited in shape, driving method, and the like as long as they can hold and cut the threadlike adhesive 2 at predetermined positions. In addition, instead of the air scissor 109, the threadlike adhesive 2 may be baked and cut by heat cutting using a heat cutter or the like.

In the threadlike adhesive sticking apparatus 101, the threadlike adhesive 2 supplied from the supply unit AU is pressed against the adherend by the nozzle 107, the springs 136 and 137, the lifting body of the horizontal moving unit 105, and the attachment plate 106. That is, the nozzle 107, the springs 136 and 137, the lifting body of the horizontal moving unit 105, and the attachment plate 106 function as the pressing mechanism BU.

(Operation of Threadlike Adhesive Sticking Apparatus 101 and Method of Sticking Threadlike Adhesive)

Using the threadlike adhesive sticking apparatus 101 configured as described above, an operator who sticks the threadlike adhesive 2 to an object first places the object on a stage. At the start of the operation, the threadlike adhesive 2 supplied from the winding body to the nozzle 107 is led out to the outside from the tip end 107d of the nozzle 107, and the operator presses the tip end into a predetermined position on the object. A relative position of the nozzle 107 with respect to the object is subjected to movement control by a control apparatus (movement control unit) (not shown) in accordance with a program set in advance. The program includes instructions such as a movement path, a movement speed, and a movement amount (a magnitude of a pressing force) in the Z direction of the nozzle 107 in the XY plane. When the movement of the nozzle 107 is started according to the program, the threadlike adhesive 2 is fed out from the winding body by an adhesive force of the threadlike adhesive 2 with respect to the object. The nozzle 107 presses the adhesive surface of the fed out adhesive surface 2, and the threadlike adhesive 2 is pressed against and stuck (pressure-bonded) to the object along a predetermined path while the nozzle 107 slides on the adhesive surface. After the sticking is completed, the threadlike adhesive 2 is cut at a predetermined position by the air chuck 108 and the air scissor 109.

Figure 11:
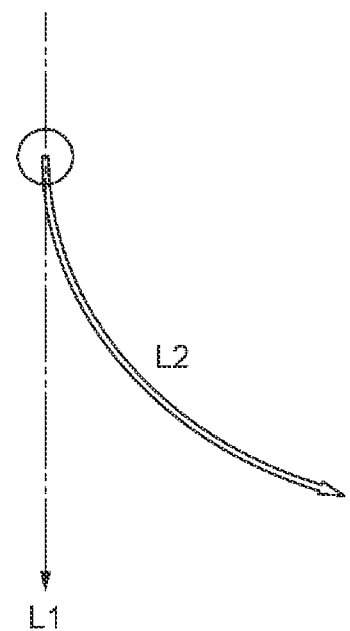
FIG. 11 is a conceptual diagram showing a mode in which the nozzle of the threadlike adhesive sticking apparatus is moved.

FIG. 11 is a conceptual diagram showing a mode in which the nozzle 107 is moved on the object. Not only when the nozzle 107 goes straight as shown by an arrow L1, but also when a curve shown by an arrow L2 is extremely bent (bent at a steep angle), the threadlike adhesive sticking apparatus 101 can stick the threadlike adhesive 2 with high accuracy. In the threadlike adhesive sticking apparatus 101, since the entire circumference (a plurality of any positions in the peripheral portion) surrounding the tip end opening 107c in the tip end 107d of the nozzle 107 functions as a pressing unit that presses the threadlike adhesive 2 against the object, the moving direction can be easily changed. Therefore, the threadlike adhesive sticking apparatus 101 can stick the threadlike adhesive 2 along a predetermined sticking path with high accuracy. Since the threadlike adhesive sticking apparatus 101 does not use a roller or the like as the pressing unit, it is possible to prevent problems such as poor sticking accuracy due to the movement of the adhesive within the width of the roller, and detachment of the adhesive from the roller depending on the sticking path, in the case where the adhesive is pressed by the roller.

When sticking the threadlike adhesive 2 to the object along a predetermined path, the threadlike adhesive sticking apparatus 101 (movement control unit) may press the nozzle 107 more strongly at a desired position, that is, increase a downward displacement amount of the nozzle attachment portion 106b in the Z-axis direction (approach the object). Even when the nozzle attachment portion 106b is momentarily lowered, it is possible to appropriately increase the force with which the nozzle 107 presses the threadlike adhesive 2 and to increase the adhesive force of the threadlike adhesive 2 at a desired position since the nozzle 107 is gently lowered by the springs 136 and 137 (absorption mechanism). In addition, the threadlike adhesive sticking apparatus 101 (movement control unit) may stop the movement in the XY plane (fix the position of the nozzle 107 with respect to the object) while pressing the nozzle 107 for several seconds at the desired position. By not moving a plane position of the nozzle 107 while pressing the nozzle 107, it is possible to increase a pressing time of the threadlike adhesive 2 and to increase the adhesive force of the threadlike adhesive 2 at a desired position. In a case where the threadlike adhesive 2 is stuck while being fed out from a winding body 120, the threadlike adhesive 2 is easily peeled off at a start point (initial stage of sticking) of a predetermined path, a start point or an end point of a curve included in the predetermined path, a vertex of a corner included in the predetermined path, or the like. Therefore, at these positions, by lowering the nozzle 107 or stopping the nozzle 107 for several seconds while pressing the nozzle 107, it is possible to increase the adhesive force of the threadlike adhesive 2 and prevent peeling.

(Feed Out Assist Mechanism)

An example in which a feed out assist mechanism is provided in the supply unit AU will be described with reference to FIG. 12 to FIG. 17. The feed out assist mechanism applies an external force in a feeding direction to the threadlike adhesive 2 fed out from the winding body 120. By applying the external force in the feeding direction by the feed out assist mechanism, it is possible to smoothly feed out the threadlike adhesive 2 from the winding body 120 against a self-adhesion force between the threadlike adhesives 2 wound around the winding body 120 even when the threadlike adhesive does not have a release liner. Therefore, the threadlike adhesive 2 can be pressed against the object in a state where the tension of the threadlike adhesive 2 is reduced. Therefore, it is possible to prevent a problem that the threadlike adhesive 2 pressed against the object is peeled off, cut, re-stuck, and entangled by tension, and to smoothly stick the threadlike adhesive 2.

Feed out assist mechanisms 150A, 150B, 150Ba, and 150C shown in FIG. 12 to FIG. 15 are provided in a path for conveying the threadlike adhesive 2 from the winding body 120 to the pressing mechanism BU, and apply, to the threadlike adhesive 2, tensile forces (arrows F1 to F3) for pulling the threadlike adhesive 2 sandwiched therebetween in the feeding direction.

Figure 12:
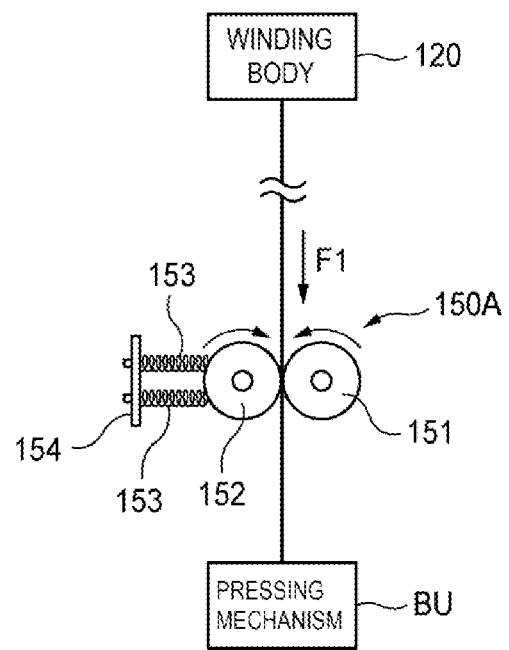
FIG. 12 is a view showing a first example of a feed out assist mechanism.

The feed out assist mechanism 150A shown in FIG. 12 includes a roller 151 (first roller), a roller 152 (second roller), a spring 153 (elastic body), and a spring attachment portion 154. The roller 151 is a feed out roller that is driven and rotated by a motor (not shown). The roller 152 sandwiches the threadlike adhesive 2 with the roller 151, is rotated in conjunction with the rotation of the roller 151, and clamps and pulls out the threadlike adhesive 2 in a direction of an arrow F1 (rotation direction). The spring 153 is attached between the roller 151 and the spring attachment portion 154, and the spring attachment portion 154 is fixed in the apparatus. The spring 153 can adjust the tensile force of the rollers 151 and 152. Further, by controlling the rotation of the roller 151, it is possible to feed out the threadlike adhesive 2 in accordance with a sticking distance (moving distance of the nozzle 107). The rollers 151 and 152 may be configured to be movable in the left-right direction (direction intersecting the direction of the arrow F1) without providing the spring 153.

Figure 13:
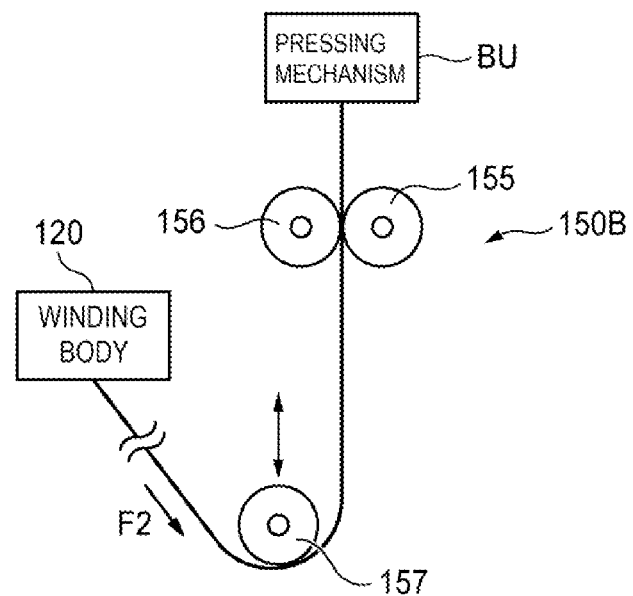
FIG. 13 is a view showing a second example of the feed out assist mechanism.

The feed out assist mechanism 150B shown in FIG. 13 has a roller 155 (third roller), a roller 156 (fourth roller), and a roller 157 (fifth roller). The rollers 155 and 156 can chuck and release the threadlike adhesive 2 therebetween. The roller 157 is disposed between the winding body 120 and the rollers 155 and 156, and is displaceable so as to lengthen a path from the winding body 120 to the rollers 155 and 156 via the roller 157. When the roller 157 is displaced so as to lengthen this path, the threadlike adhesive 2 is pulled and fed out from the winding body 120 in a direction of an arrow F2. The fed out threadlike adhesive 2 is chucked by the rollers 155 and 156 and supplied to the pressing mechanism BU (nozzle 107). Then, when the chuck by the rollers 155 and 156 is released, the pressing mechanism BU presses the threadlike adhesive 2 against the object. While the chuck by the rollers 155 and 156 is released, the roller 157 returns to an original position. By controlling the displacement of the roller 157, it is possible to feed out the threadlike adhesive 2 in accordance with the sticking distance (moving distance of the nozzle 107). In addition, when the threadlike adhesive 2 becomes insufficient during the sticking of the threadlike adhesive 2, the threadlike adhesive 2 can be chucked again by the rollers 155 and 156, and the roller 157 can be displaced to feed out the threadlike adhesive 2.

Figure 14:
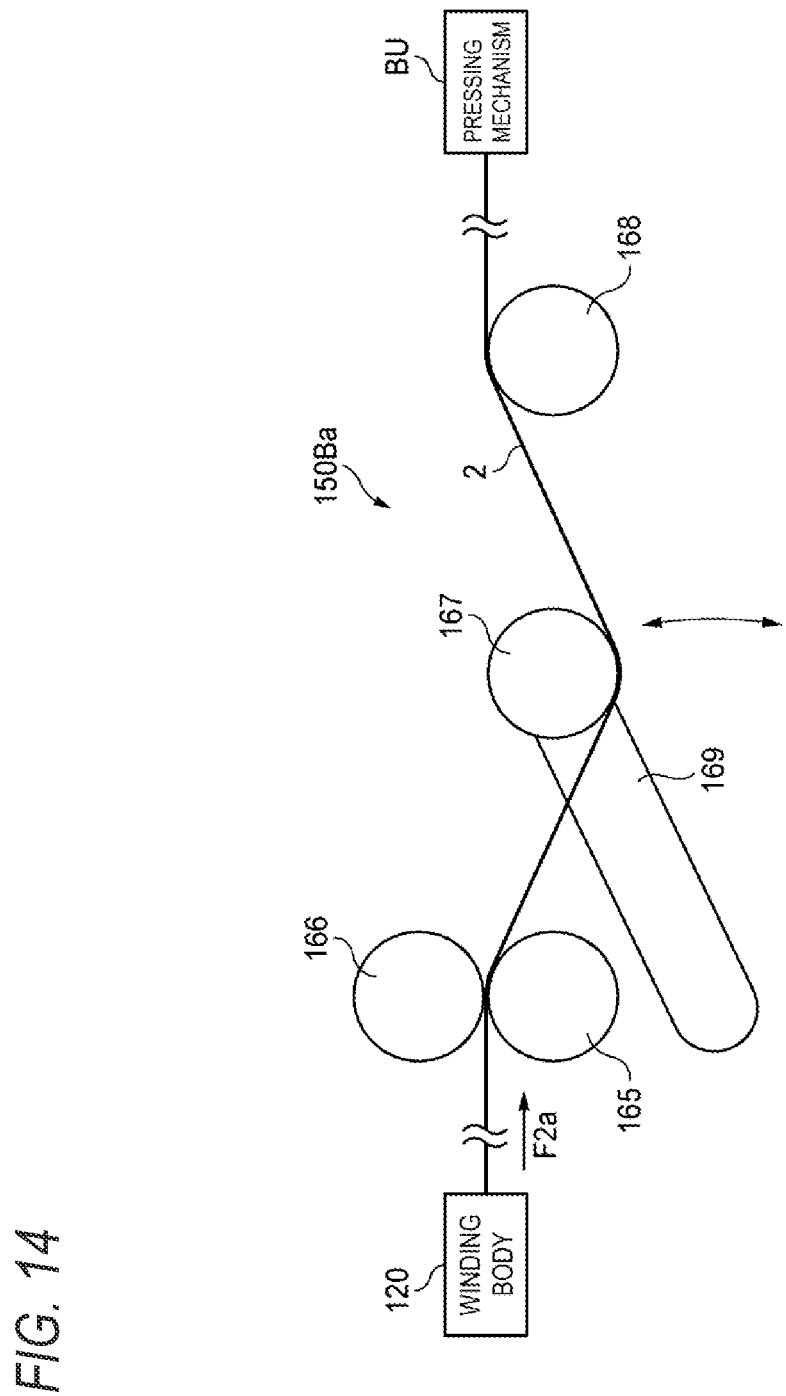
FIG. 14 is a view showing a third example of the feed out assist mechanism.

The feed out assist mechanism 150Ba shown in FIG. 14 has rollers 165, 166, 167, 168 and an arm 169. The roller 165 is a feed out roller that is driven and rotated by a motor (not shown). The roller 166 sandwiches the threadlike adhesive 2 with the roller 165, is rotated in conjunction with the rotation of the roller 165, and clamps and pulls out the threadlike adhesive 2 in a direction of an arrow F2a. The rollers 167 and 168 are provided between the rollers 165 and 166 and the pressing mechanism BU, and guide the threadlike adhesive 2 pulled out by the rollers 165 and 166 to the pressing mechanism BU. The arm 169 has one end to which the roller 167 is attached and the other end which is pivotally supported by a housing of the threadlike adhesive sticking apparatus 101 and to which a potentiometer for calculating the position of the roller 167 is attached. When the roller 167 is moved downward from a position shown in FIG. 14 (is displaced so as to lengthen a path from the rollers 165 and 166 to the roller 168), a conveying speed of the threadlike adhesive 2 decreases. In this way, the threadlike adhesive 2 is fed out by the rollers 165 and 166, and a rapid speed change of the fed out threadlike adhesive 2 can be alleviated by the displacement of the roller 167.

Figure 15:
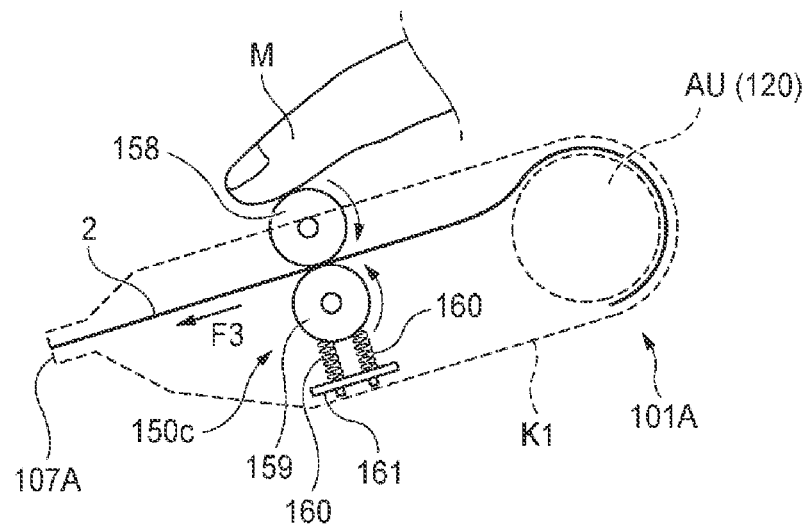
FIG. 15 is a view showing a fourth example of the feed out assist mechanism.

FIG. 15 shows an example in which the feed out assist mechanism 150C is provided in a threadlike adhesive sticking apparatus 101A in a mode of being gripped and used by an operator. Members having the same functions as those of the threadlike adhesive sticking apparatus 101 are denoted by the same reference numerals. The threadlike adhesive sticking apparatus 101A includes the supply unit AU (winding body 120) and the feed out assist mechanism 150C in a housing K1 having a size and a shape that can be held by one hand of an operator, and has a nozzle 107A at a tip end of the housing K1. The feed out assist mechanism 150C includes a roller 158 (first roller), a roller 159 (second roller), a spring 160 (elastic body), and a spring attachment portion 161. The roller 158 is exposed to the outside of the housing K1 from a portion of which a part is cut out in the housing K1, and is rotated by a finger M of the operator. The roller 159 sandwiches the threadlike adhesive 2 with the roller 158, is rotated in conjunction with the rotation of the roller 158, and clamps and pulls out the threadlike adhesive 2 in a direction of an arrow F3 (rotation direction). The spring 160 is attached between the roller 159 and the spring attachment portion 161, and the spring attachment portion 161 is fixed to an inner wall of the housing K1. A compression force (degree of collapse) to the threadlike adhesive 2 can be adjusted by the spring 160.

The threadlike adhesive 2 pulled and fed out by the feed out assist mechanism 150C is allowed to pass through the cylindrical internal space of the nozzle 107A at the tip end of the housing K1 with low tension, and is led out to the outside of the housing K1. The nozzle 107A is formed of the same material as that of the nozzle 107, and a tip end opening thereof has a circular shape or a polygonal shape having five or more corners. In addition, the nozzle 107A presses the threadlike adhesive 2, which has been allowed to pass through the cylindrical internal space and has been led out to the outside, against the object at the entire circumference or at a plurality of any positions of the peripheral portion surrounding the tip end opening. That is, the operator holding the housing K1 can stick the threadlike adhesive 2 to the object in any path by pressing the nozzle 107A against the object while rotating the roller 158 with the finger M using the threadlike adhesive sticking apparatus 101A, just like operating a writing instrument such as a pen.

Figure 16:
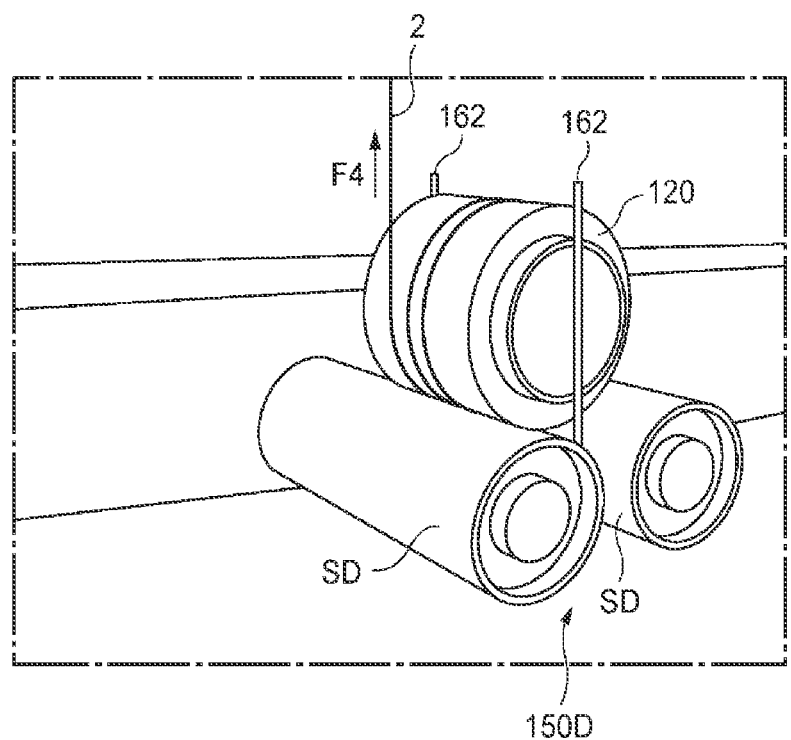
FIG. 16 is a view showing a fifth example of the feed out assist mechanism.
Figure 17:
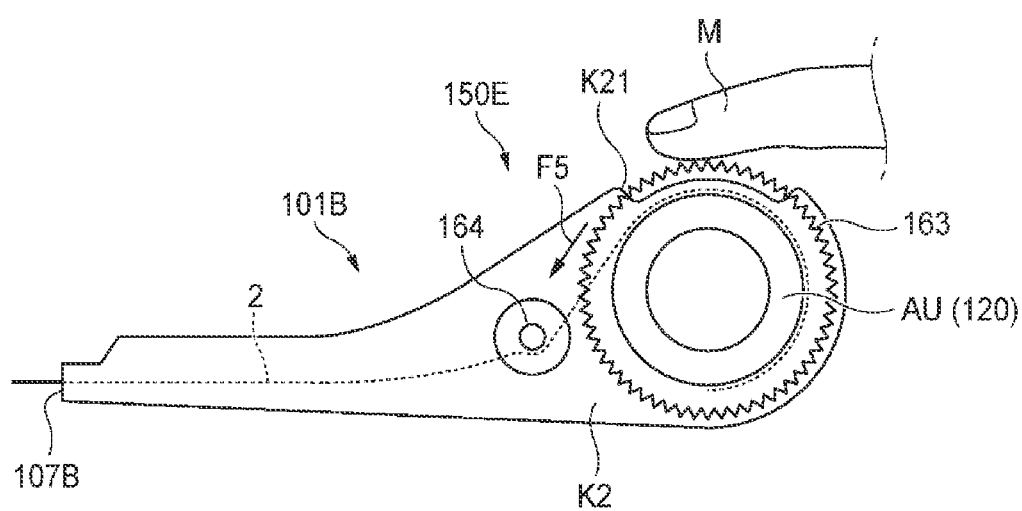
FIG. 17 is a view showing a sixth example of the feed out assist mechanism.

Feed out assist mechanisms 150D and 150E shown in FIG. 16 and FIG. 17 apply, to the threadlike adhesive 2, an extrusion force for feeding out the threadlike adhesive 2 by rotating the winding body 120 in the feeding direction.

The feed out assist mechanism 150D shown in FIG. 16 includes a surface drive SD and winding body holding rods 162, and holds the winding body 120 in place of the winding body holding unit of the threadlike adhesive sticking apparatus 101. The surface drive SD comes into contact with the threadlike adhesive 2 wound around the winding body 120 or the outer peripheral surface of the winding body 120, and rotatably holds the winding body 120. The surface drive SD is rotationally driven by a motor (not shown) to rotate the winding body 120 in the feeding direction indicated by an arrow F4. The winding body holding rods 162 are disposed on both end sides of the winding body 120, and hold the winding body 120 held by the surface drive SD so as to be rotatable and prevent the winding body 120 from falling off from the surface drive SD. The threadlike adhesive 2 is supplied to the pressing mechanism BU at a low tension by the feed out assist mechanism 150D that applies an extrusion force to the threadlike adhesive 2 by rotating the winding body 120.

FIG. 17 shows an example in which the feed out assist mechanism 150E is provided in a threadlike adhesive sticking apparatus 101B in a mode of being gripped and used by an operator. Members having the same functions as those of the threadlike adhesive sticking apparatus 101 are denoted by the same reference numerals. The threadlike adhesive sticking apparatus 101B includes the supply unit AU (winding body 120) and the feed out assist mechanism 150E in a housing K2 having a size and a shape that can be held by one hand of an operator, and has a nozzle 107B at a tip end of the housing K2. The feed out assist mechanism 150E has a gear 163 and a roller 164. The gear 163 is attached to the supply unit AU (winding body 120) and rotated together with the winding body 120. The gear 163 is exposed to the outside of the housing K2 from a portion K21 of which a part is cut out in the housing K2, and is rotated by a finger M of the operator. When the gear 163 is rotated by the finger M, an extrusion force is applied to the threadlike adhesive 2. The extruded threadlike adhesive 2 is guided by the roller 164 to reach the nozzle 107B, is allowed to pass through the cylindrical internal space of the nozzle 107B with low tension, and is led out to the outside of the housing K2. The nozzle 107B has the same configuration as the nozzle 107A. The nozzle 107B presses the threadlike adhesive 2, which has been allowed to pass through the cylindrical internal space and has been led out to the outside, against the object at the entire circumference or at a plurality of any positions of the peripheral portion surrounding the tip end opening. Therefore, the operator holding the housing K2 can draw any path by pressing the nozzle 107B against the object while rotating the gear 163 with the finger M. Therefore, the operator can stick the threadlike adhesive 2 to the object in any path (in various shapes) using the threadlike adhesive sticking apparatus 101B, just like operating a writing instrument such as a pen. Instead of the feed out assist mechanism 150E shown in FIG. 17, the movement of the nozzle 107B (pressing of the threadlike adhesive 2 by the nozzle 107) may be transmitted to a core (rotation shaft) of the winding body 120 by a belt formed of rubber or the like to assist the feeding out of the threadlike adhesive 2. In addition, the feeding out of the threadlike adhesive 2 may be assisted by directly rotating the core of the winding body 120.

It is preferable that a member such as a roller for applying tension to the threadlike adhesive 2 does not exist in a path for conveying the threadlike adhesive 2 between the feed out assist mechanisms 150A, 150B, 150Ba, 150C, 150D, and 150E, the pressing mechanism BU (nozzle 107), and the nozzles 107A and 107B. In addition, in the threadlike adhesive sticking apparatus 101, a tension detector may be provided in a path for conveying the threadlike adhesive 2, and the feed out assist mechanisms 150A, 150B, and 150D may be controlled according to a detected tension value to feed out the threadlike adhesive 2 so as to have a constant tension. Further, in the above embodiment, an example in which the threadlike adhesive 2 is stuck to the adherend placed on the stage is shown, but the threadlike adhesive 2 can be stuck to an adherend having a three-dimensional shape such as a curved surface by attaching the nozzle 107 to an articulated robot arm having a degree of freedom of six axes, for example.

Second Embodiment

Figure 18:
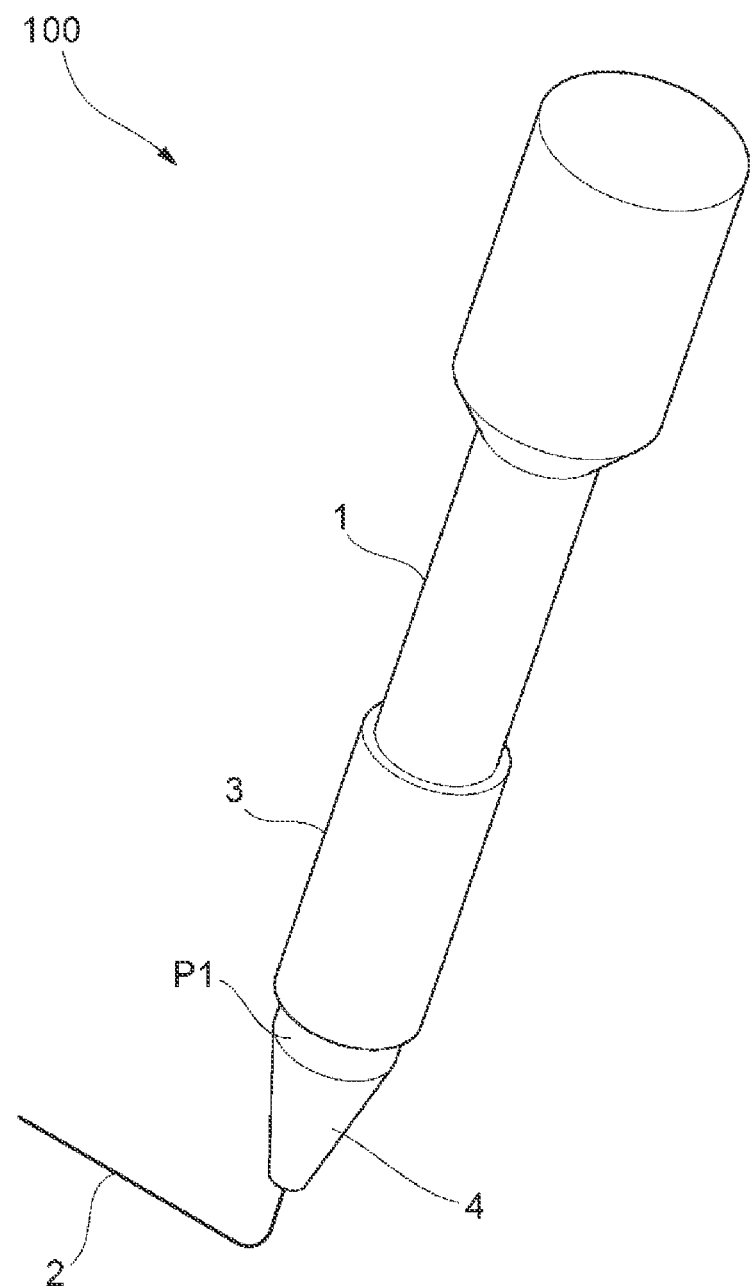
FIG. 18 is a perspective view showing a threadlike adhesive sticking apparatus according to a second embodiment of the present invention.

FIG. 18 is a schematic view showing a threadlike adhesive sticking apparatus according to a second embodiment of the present invention. As shown in FIG. 18, a threadlike adhesive sticking apparatus 100 of the present embodiment includes a main body 1 having a shaft shape, and a tip end portion 4 detachably provided at one end of the main body 1. The main body 1 is provided with a grip 3 formed of a resin or the like.

An operator grips the threadlike adhesive sticking apparatus 100 at the portion of the grip 3, presses the tip end portion 4 against an object which is an adherend of the threadlike adhesive 2, and moves the tip end portion 4 in one direction, whereby the threadlike adhesive 2 can be fed out. That is, the operator can use the threadlike adhesive sticking apparatus 100, just like operating a writing instrument such as a pen, while gripping (grip 3 of) the elongated main body 1 having a shaft shape. For example, the operator can operate the threadlike adhesive sticking apparatus 100 as expected even in a narrow location or the like with many obstacles, and can efficiently perform various operations.

The main body 1 has a shaft shape extending in a uniaxial direction. An internal space S having a shaft shape is defined inside the main body 1 as shown in FIG. 18. The tip end portion 4 having a tapered shape is detachably attached to one end (tip end) of the main body 1. A shape of the tip end portion 4 may be a shape having a cylindrical pipe at the tip of the tapered shape, like a tip of a mechanical pencil. A tip end opening 4a is formed at the tip end of the tip end portion 4, and the internal space S of the main body 1 communicates with the outside through the tip end opening 4a (tubular internal space). The tip end portion 4 is defined by a region from a position P1 (FIG. 18) where a cross-sectional area thereof is smaller than that of the main body 1 to the tip end opening 4a. At the other end (rear end) of the main body 1, a winding body capable of winding the threadlike adhesive 2 is attached inside.

Figure 19A:
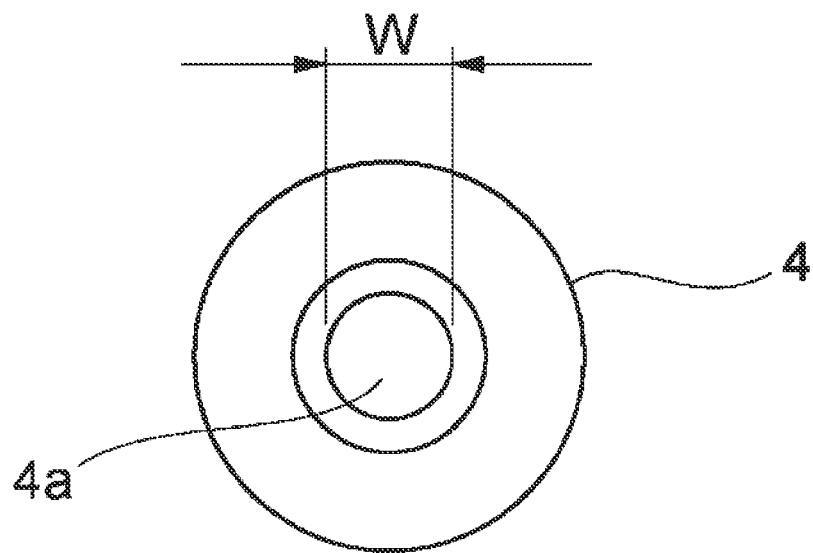
Figure 19B:
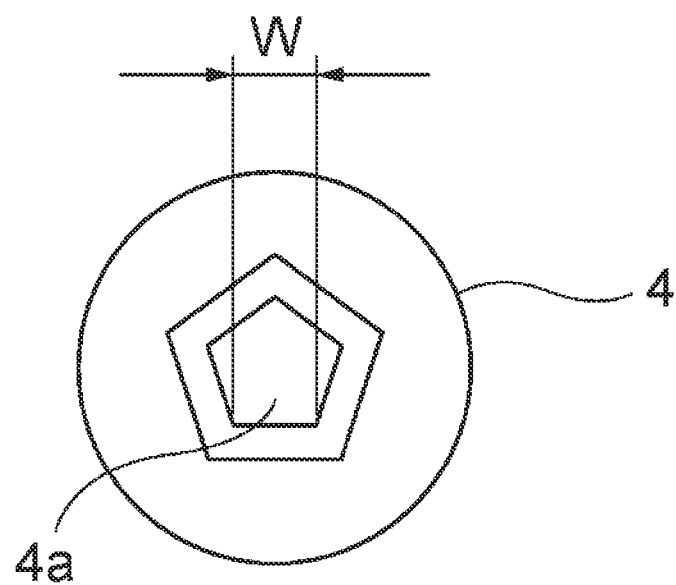

In the present embodiment, since the tip end portion 4 has a tapered shape of which a cross section becomes smaller toward the tip end, workability in a narrow location is improved. In addition, in a case where the tip end portion 4 has a cylindrical pipe at the tip of the tapered shape, as the pipe is thinner and longer, workability in a narrower location is improved. FIG. 19A and FIG. 19B are views showing an example of the cross-section of the tip end portion 4 as viewed from a tip end opening 4a side, in which FIG. 19A shows the tip end portion 4 having a circular cross-section and FIG. 19B shows the tip end portion 4 having a pentagonal cross-section. Since a plurality of portions of the peripheral portion of the tip end opening 4a having a circular cross-sectional shape or a polygonal cross-sectional shape having five or more sides function as the pressing unit, the sticking direction can be easily changed. An overall shape of the tip end portion 4 is not particularly limited, and examples thereof include a conical shape, a quadrangular pyramid shape, and a fountain pen tip shape (saucer shape). The overall shape of the tip end portion 4 may be an extremely elongated straw shape.

A length of the tip end portion 4 shown in FIG. 18 is preferably 3 mm or more, and more preferably 10 mm or more. A width W of the tip end portion 4 shown in FIG. 19 is defined by a position where the cross-sectional area of the tip end portion 4 is the smallest, but the width W also corresponds to an inner diameter (diameter) of the tip end portion 4. The minimum cross-sectional area of the tip end portion 4 is preferably in a range of 1.2 to 9 times the cross-sectional area of the threadlike adhesive 2. Therefore, for example, in a case where the cross-section of the threadlike adhesive 2 has a circular shape having a diameter of 0.3 mm, the size of the width W of the tip end portion 4 is set in a range of about 0.32 mm to 0.9 mm. Such a size is expected to improve workability. In addition, in the threadlike adhesive sticking apparatus 100, the unnecessary movement of the threadlike adhesive 2 is restricted by the tip end opening 4a of the tip end portion 4. Therefore, without using a roller or the like as the pressing unit, the operator can grip the threadlike adhesive sticking apparatus 100 at the portion of the grip 3 and stick the threadlike adhesive 2 while moving the tip end portion 4 in a plurality of any directions. Therefore, in a case where the adhesive is pressed by the roller, it is possible to prevent a problem that the adhesion accuracy is poor due to the movement of the adhesive within a roller width, and the adhesive is detached from the roller depending on an adhesion path, and thus it is possible to accurately stick the threadlike adhesive. Further, in the case where the tip end portion 4 has a cylindrical pipe at the tip of the tapered shape, as the pipe is thinner and longer, workability in a narrower location is improved.

Third Embodiment

Figure 20:
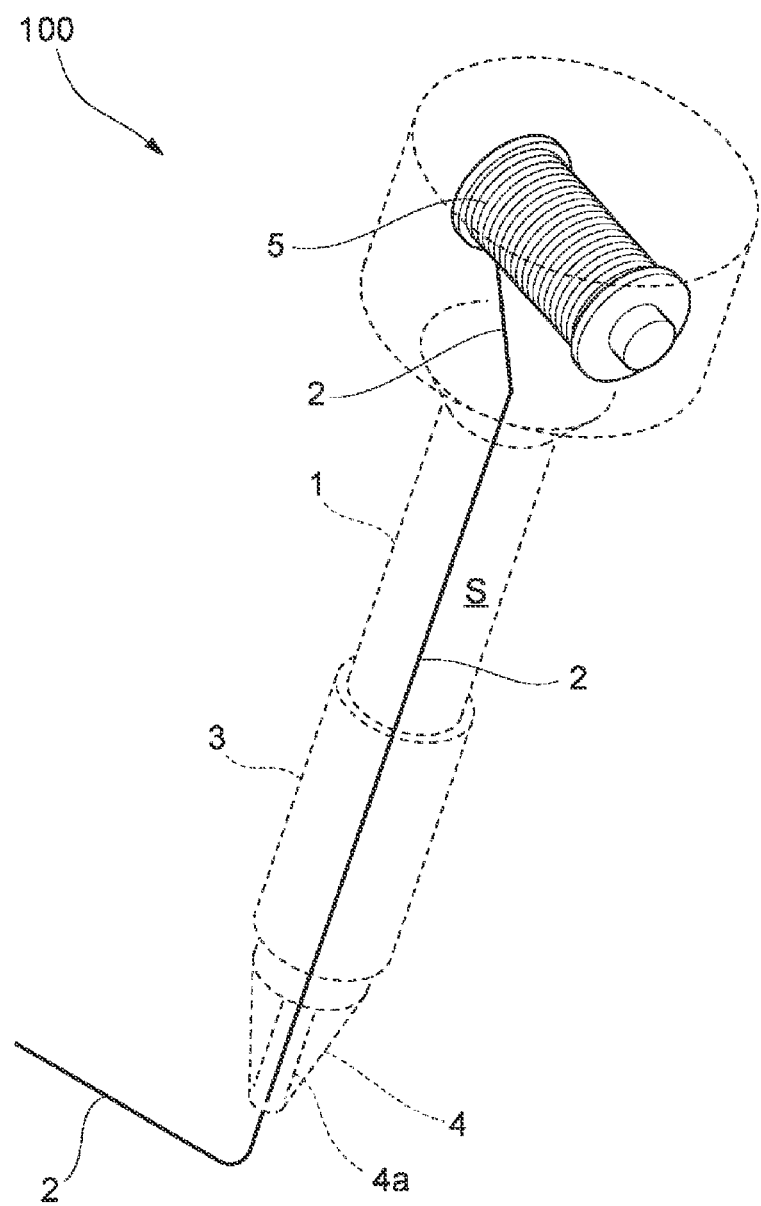
FIG. 20 is a perspective view showing an internal structure of a threadlike adhesive sticking apparatus according to a third embodiment.

FIG. 20 is a perspective view showing an internal structure of a threadlike adhesive sticking apparatus 100 according to a third embodiment. In the present embodiment, at the other end (rear end) of the main body 1, a winding body 5 capable of winding the threadlike adhesive 2 is rotatably attached with a direction perpendicular to an axial direction of the main body 1 as an axis. Since the threadlike adhesive 2 is allowed to pass through the internal space S and goes out from the tip end opening 4a, unnecessary movement is restricted. Further, since a plurality of portions of the peripheral portion of the tip end opening 4a function as the pressing unit, a sticking direction can be easily changed.

Fourth Embodiment

Figure 21:
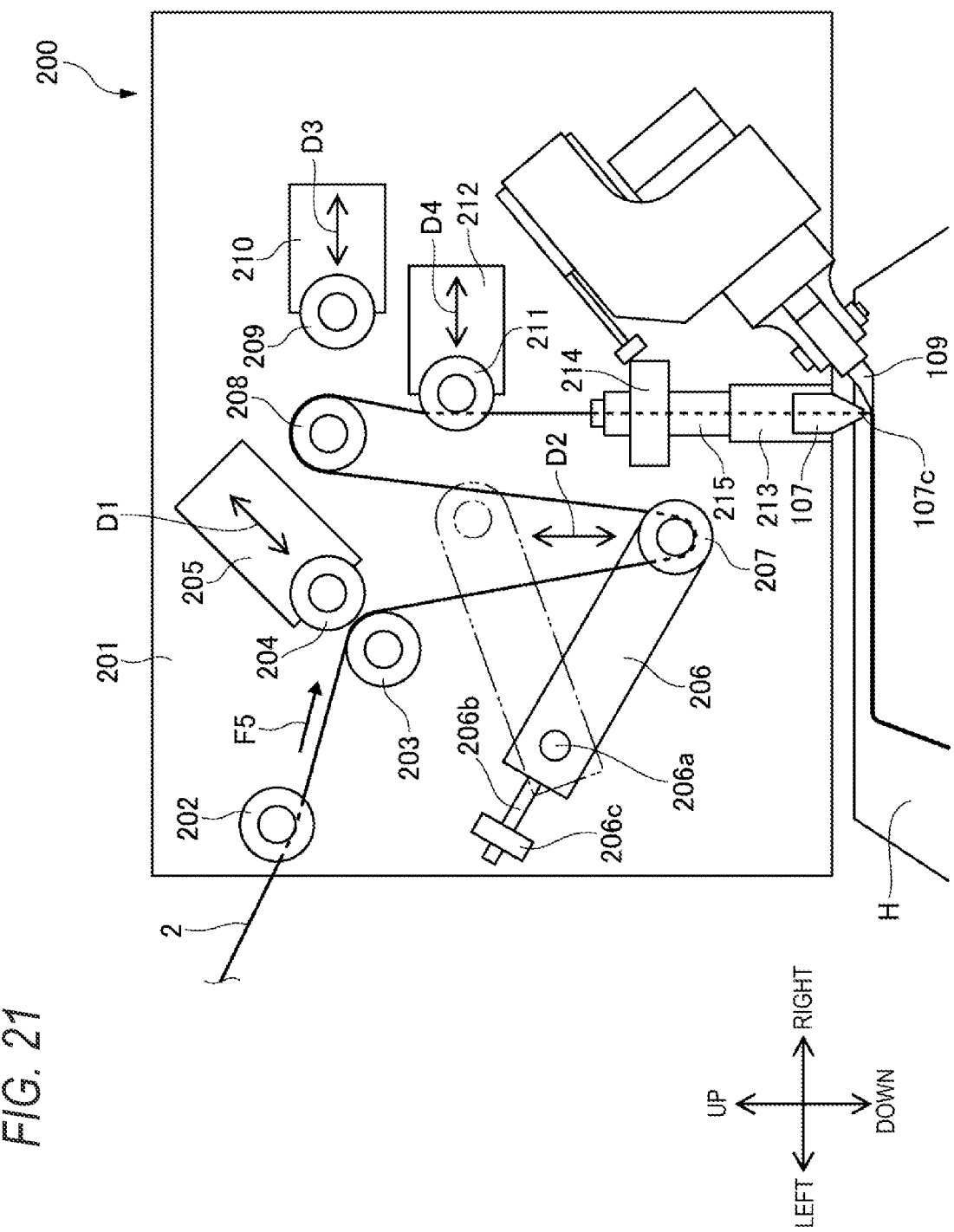
FIG. 21 is a schematic front view showing a main part of a threadlike adhesive sticking apparatus according to a fourth embodiment.

FIG. 21 is a schematic front view showing a main part of a threadlike adhesive sticking apparatus 200 according to a fourth embodiment. The threadlike adhesive sticking apparatus 200 is different from the threadlike adhesive sticking apparatus 101 according to the first embodiment in configurations of the pressing mechanism BU and the conveyance unit CU and a configuration for reducing an extra length of the threadlike adhesive 2 at the time of cutting. Hereinafter, differences from the first embodiment will be mainly described, and redundant description will be omitted.

In the threadlike adhesive sticking apparatus 200, main parts of the pressing mechanism BU and the conveyance unit CU are attached to front of an attachment plate 201 having a substantially rectangular shape, and are positioned by the positioning unit DU.

(Conveyance Unit CU of Threadlike Adhesive Sticking Apparatus 200)

The threadlike adhesive sticking apparatus 200 includes a roller 122 (see FIG. 5), rollers 202, 203, and 204, a moving unit 205, an arm 206, rollers 207, 208, and 209, a moving unit 210, a roller 211, and a moving unit 212 as an example of the conveyance unit CU, and conveys the threadlike adhesive 2 fed out from the supply unit AU (winding body) to the nozzle 107.

The rollers 202, 203, 204, 207, 208, 209, and 211 are configured similarly to the above-described roller 122 and the like, and are rotatably attached to the attachment plate 201 directly or indirectly, in a perpendicular plane (YZ plane). As an example, the rollers 202, 203, 204, 207, 208, 209, and 211 are disposed such that respective rotation positions are at substantially the same distance from the front surface side of the attachment plate 201 (front side of the paper surface in FIG. 21).

The roller 202 is attached to an upper left corner of the attachment plate 201, and guides the threadlike adhesive 2 to the rollers 203 and 204. On the left side of the roller 202, and on the right side of the roller 122 in the frame erected on the left side of the winding body holding unit 121, a roller capable of being moved up and down according to the tension of the threadlike adhesive 2 to be conveyed and a roller provided on the upper right side of the roller (both not shown) may be disposed. The tension of the threadlike adhesive 2 supplied to the roller 202 can be adjusted to be constant by these rollers.

The roller 203 is attached to the attachment plate 201 slightly below the right side of the roller 202. The roller 203 is a feed out roller that is driven and rotated by a motor (not shown).

The roller 204 is disposed on the upper right of the roller 203, and is attached to a lower left end portion of the moving unit 205 such as an air cylinder that is moved (slides) in a direction of an arrow D1 (upper right and lower left directions) with respect to the attachment plate 201. When the roller 204 is located at the lowest left, the roller 204 is rotated in conjunction with the rotation of the roller 203, sandwiches the threadlike adhesive 2 with the roller 203, and pulls out the threadlike adhesive 2 in a direction of an arrow F5.

The arm 206 is a rod-shaped body extending in the left-right direction below the rollers 202 and 203 and the moving unit 205. The roller 207 is attached to the right end portion of the arm 206. A vicinity of the left end portion of the arm 206 is rotatably supported to the attachment plate 201 by a rotation shaft 206a. A potentiometer for calculating a position of the roller 207 is attached to the rotation shaft 206a. The arm 206 is rotated in a direction of an arrow D2 (substantially in up-down direction) by a drive unit such as a motor provided on the rear side of the attachment plate 201, for example. That is, the roller 207 is movable in the up-down direction by the rotation of the arm 206.

A shaft 206b, which extends along an extending direction of the arm 206 and is provided with a spiral ridge on the outer peripheral surface thereof, protrudes from the left end portion of the arm 206. One or more weights 206c are attached to the shaft 206b. The weight 206c has a substantially disc shape, and a through hole provided at the center of the weight 206c is formed with a groove to be screwed with the spiral ridge of the shaft 206b. The ease of movement of the arm 206 can be controlled by changing a distance between the weight 206c and the rotation shaft 206a (left end portion of the arm 206) by shifting the position of the weight 206c on the shaft 206b.

The roller 208 is attached to the upper right of the roller 207 and the right side of the roller 204 in the attachment plate 201. The roller 208 guides the threadlike adhesive 2 pulled out by the rollers 203 and 204 to, via the roller 207, the pressing mechanism BU (nozzle 107) provided immediately below the roller 208.

When the roller 207 is moved downward (displaced so as to lengthen a path from the rollers 203 and 204 to the roller 208), a conveying speed of the threadlike adhesive 2 decreases. In this way, the threadlike adhesive 2 is fed out by the rollers 203 and 204, and a rapid speed change of the fed threadlike adhesive 2 can be alleviated by the displacement of the roller 207. That is, the rollers 203, 204, 207, and 208 and the arm 206 function as the feed out assist mechanism 150Ba shown in FIG. 14.

(Reduction of Extra Length in Threadlike Adhesive Sticking Apparatus 200)

On the right side of the roller 208, i.e., above the nozzle 107, a roller 209 attached to a left end portion of the moving unit 210 that is moved in a direction of an arrow D3 (left-right direction) with respect to the attachment plate 201 is disposed. The roller 209 is disposed adjacent to the roller 208 so that the threadlike adhesive 2 can be nipped between the roller 209 and the roller 208 when being positioned at the leftmost position. The roller 209 provided upstream of the nozzle 107 nips (chucks) the threadlike adhesive 2 with the roller 208 when the sticking of the threadlike adhesive 2 is completed and the nozzle 107 is raised. In this state, the threadlike adhesive 2 is cut at a position close to an adherend H.

In the first embodiment, the threadlike adhesive 2 is chucked below (downstream of) the nozzle 107 by the air chuck 108, whereas in the present embodiment, the roller 209 is provided upstream of the nozzle 107, and the threadlike adhesive 2 is chucked with the roller 208 that conveys the threadlike adhesive 2. With this configuration, since a space for the air chuck 108 below the nozzle 107 can be reduced, an extra length at the time of cutting (end point) can be reduced.

The roller 211 is disposed below the rollers 208 and 209 and the moving unit 210, that is, above the nozzle 107, and is attached to the left end portion of the moving unit 212 that is moved in a direction of an arrow D4 (left-right direction) with respect to the attachment plate 201. As an example, when the roller 211 is positioned on the right side, the roller 211 allows the threadlike adhesive 2 to pass therethrough and guides the threadlike adhesive 2 into the nozzle 107, and when the threadlike adhesive 2 is cut, the roller 211 is moved to the left side to press the threadlike adhesive 2 in a left direction, and moves the cut tip end portion (lower end portion) of the threadlike adhesive 2 upward. By raising the lower end portion of the threadlike adhesive 2 after cutting the threadlike adhesive 2, it is possible to reduce the extra length at the start of the next sticking of the threadlike adhesive 2 (start point). When allowing the threadlike adhesive 2 to pass through the right side of the roller 211, the roller 211 is moved to the right side to pull the threadlike adhesive 2 in a right direction, so that the lower end portion of the threadlike adhesive 2 can be moved upward.

The extra length of the threadlike adhesive 2 may be reduced by rotating the roller 203 or the like in a reverse direction, but there is a concern that the threadlike adhesive 2 may be wound around the roller 203 or the like due to the reverse rotation and may not be wound around the winding body. In this regard, as described above, by nipping and cutting the threadlike adhesive 2 by the rollers 208 and 209 and then raising the lower end portion of the threadlike adhesive 2 by the roller 211, it is possible to reduce the extra length of the end point and the start point without the above-described problem.

A guide rod (not shown) erected on the front of the attachment plate 201 may be provided below the roller 211. A surface (outer peripheral surface) of the guide rod is a non-adhesive surface, and thus it is possible to restrict the displacement of the threadlike adhesive 2 in the left direction.

(Pressing Mechanism BU of Threadlike Adhesive Sticking Apparatus 200)

The threadlike adhesive sticking apparatus 200 includes the nozzle 107, a slider 213, a fixing unit 214, and a spring 215 as an example of the pressing mechanism BU, and sticks the threadlike adhesive 2 conveyed to the conveyance unit CU to the adherend H. The pressing mechanism BU is provided below the roller 211 and the moving unit 212 on the attachment plate 201.

The nozzle 107 is fixed to the front of the slider 213, and the tip end opening 107c can protrude from the lower end of the attachment plate 201. The slider 213 is movable in the up-down direction with respect to the attachment plate 201 by a linear guide or the like.

In the attachment plate 201, the fixing unit 214 is fixed above the slider 213. The fixing unit 214 holds the spring 215, in which a shaft inserted therein, with the upper surface of the slider 213.

As described above, as in the first embodiment, the nozzle 107 of the present embodiment includes an absorption mechanism that is movable in the up-down direction and absorbs a displacement of the nozzle 107 with respect to a displacement of a base to which the nozzle 107 is attached in the up-down direction.

Further, the air scissor 109 (nipper) is disposed on the right side of the pressing mechanism BU in the attachment plate 201. The air scissor 109 is moved obliquely to the lower left from a normal position by a driving unit, and cut the threadlike adhesive 2 immediately below the nozzle 107. At this time, as described above, since the threadlike adhesive 2 is chucked above the nozzle 107 (by the rollers 208 and 209), the air chuck 108 becomes unnecessary. Therefore, a distance between the nozzle tip end 107c and the threadlike adhesive 2 attached to the adherend H can be reduced, and the extra length at the time of cutting (end point) can be reduced.

(Improvement of Sticking with Short Extra Length)

Figure 22:
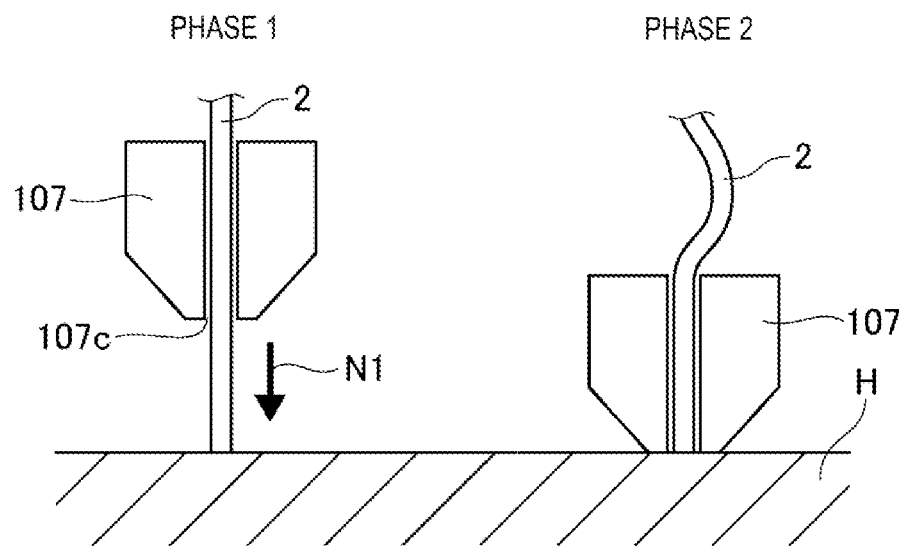
FIG. 22 is a diagram for illustrating a problem of sticking start point creation when an extra length is short.
Figure 23:
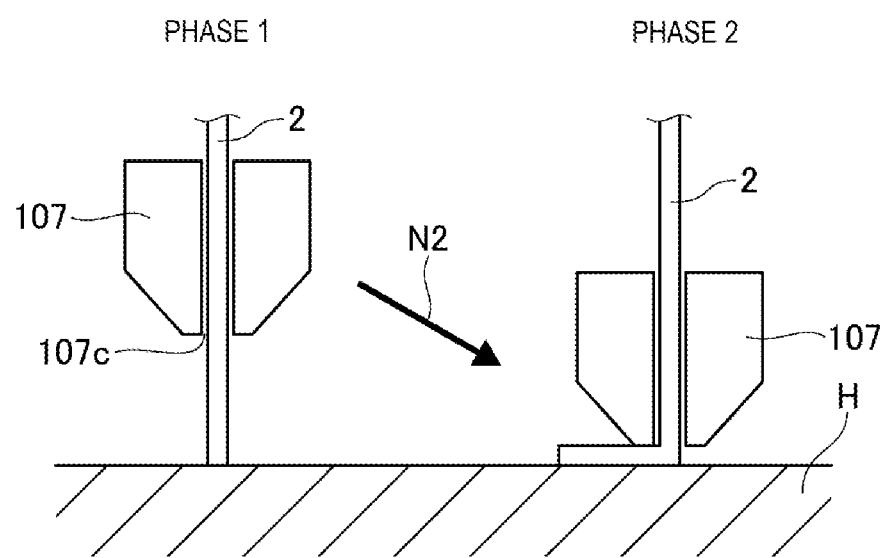
FIG. 23 is a diagram for illustrating a movement of a nozzle in the sticking start point creation when the extra length is short.

The movement of the nozzle 107 in the sticking start point creation when the extra length is short will be described with reference to FIG. 22 and FIG. 23. In the case where the extra length is short at the start of sticking of the threadlike adhesive 2, when the nozzle 107 is vertically lowered in a direction of an arrow N1 shown in PHASE 1 of FIG. 22, the threadlike adhesive 2 may enter the inside of the nozzle 107, as shown in PHASE 2 of FIG. 22, and the start point may not be attached to the adherend H. Therefore, when the nozzle 107 is lowered in an oblique direction (direction of an arrow N2) from the state shown in PHASE 1 of FIG. 23, the start point can be created without the threadlike adhesive 2 entering the nozzle 107, as shown in PHASE 2 of FIG. 23.

As described above, the threadlike adhesive sticking apparatus 200 includes the feed out assist mechanism (the rollers 203, 204, 207, and 208 and the arm 206) and the configuration for reducing the extra length (the rollers 208 and 209 which chuck the threadlike adhesive 2 upstream of the nozzle 107, and the roller 211 which presses/pulls the cut threadlike adhesive 2 upstream of the nozzle 107). According to this configuration, in addition to the same effect as that of the first embodiment, it is possible to convey the threadlike adhesive 2 at a low tension, and it is possible to reduce the extra length at the start and end of sticking. Therefore, the threadlike adhesive 2 can be stuck at high speed without waste.

Fifth Embodiment

Figure 24:
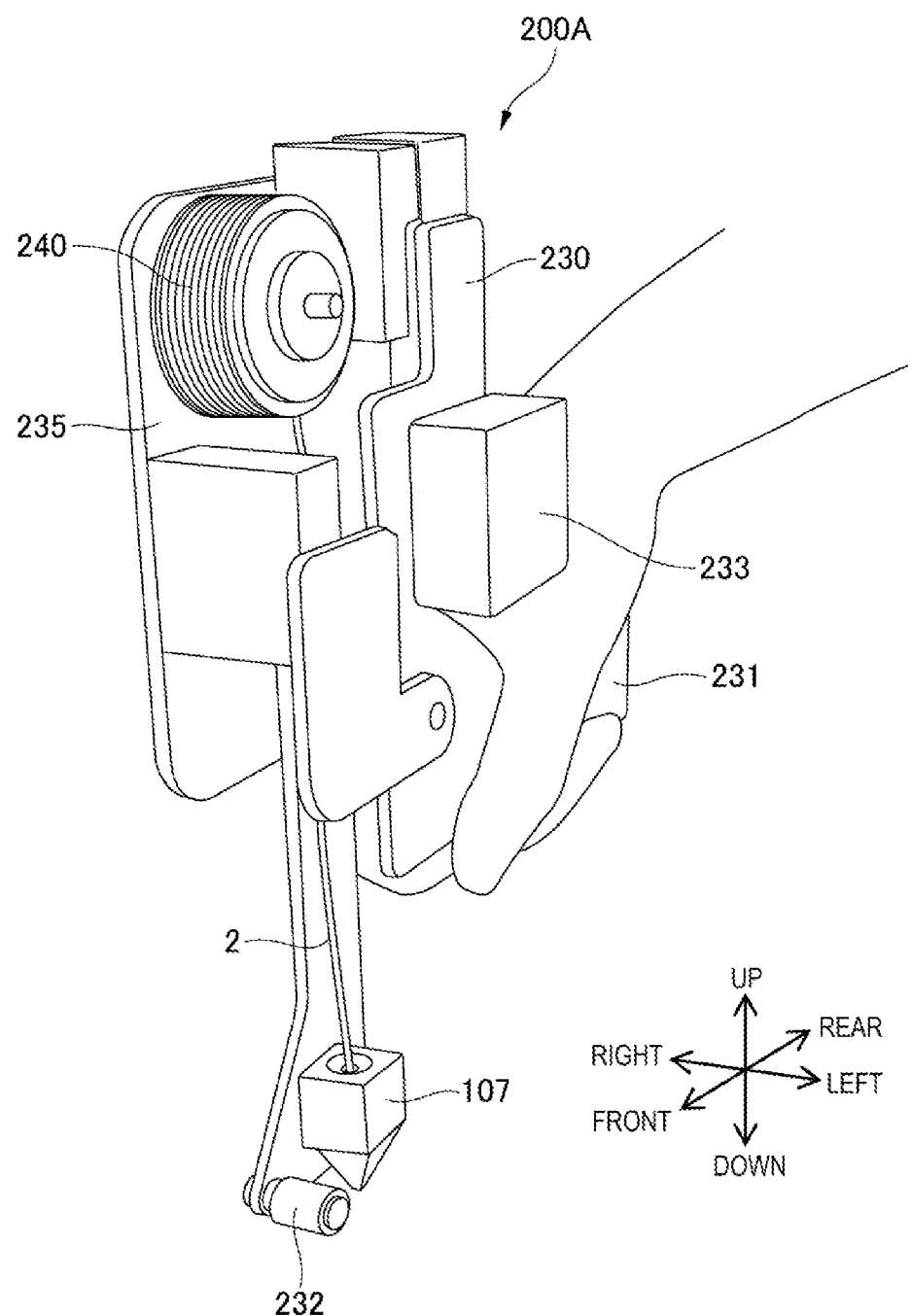
FIG. 24 is a perspective view showing a threadlike adhesive sticking apparatus according to a fifth embodiment.
Figure 25:
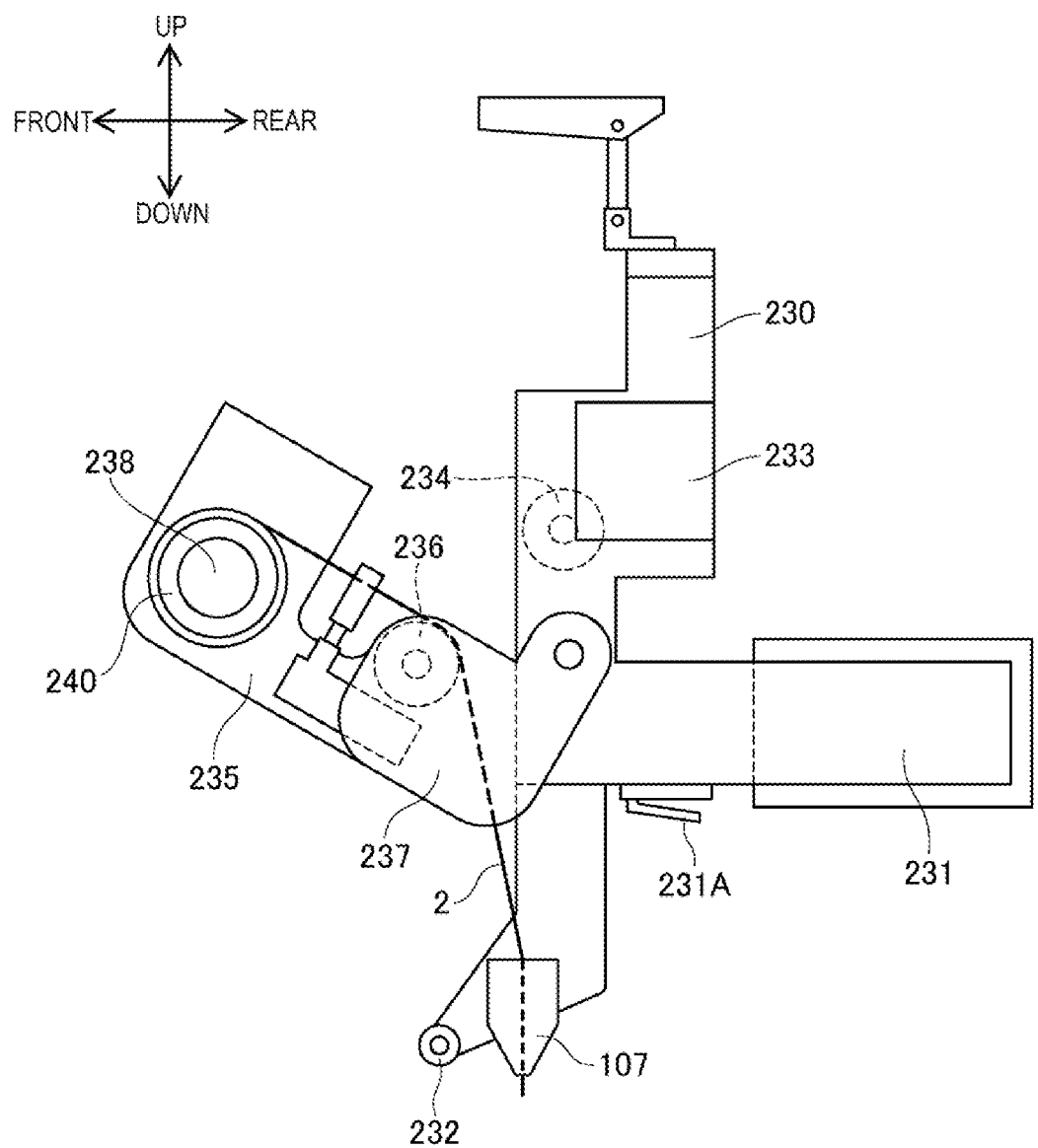
FIG. 25 is a front view showing a state where an opening/closing frame is opened in the threadlike adhesive sticking apparatus according to the fifth embodiment.

FIG. 24 is a perspective view showing a threadlike adhesive sticking apparatus 200A according to a fifth embodiment. FIG. 25 is a front view showing a state where an opening/closing frame 235 is opened in the threadlike adhesive application device 200A according to the fifth embodiment. The threadlike adhesive sticking apparatus 200A mainly includes a main body frame 230, a gripping portion 231, and an opening/closing frame 235 in which a winding body 240 capable of winding the threadlike adhesive 2 is held.

In the main body frame 230, a lower portion of an elongated plate member extending in the up-down direction is bent in an oblique direction to be tapered. The nozzle 107 is fixed to the bent portion of the main body frame 230, and a pressing roller 232 is provided at the tapered lower end. As shown in FIG. 25, the nozzle 107 is attached along an axial direction of the main body frame 230. In addition, the pressing roller 232 is disposed at a position slightly above the tip end opening 107c on the front side of the tip end opening 107c of the nozzle 107. The pressing roller 232 is rotatably attached to the main body frame 230 in a vertical plane. The function of the pressing roller 232 will be described later.

A motor 233 and a roller 234 driven by the motor 233 are attached to substantially the center of the main body frame 230. The roller 234 is rotatably attached to the opening/closing frame 235 in the vertical plane, and sandwiches the threadlike adhesive 2 with a roller 236 being rotated with the rotation of the roller 234 to feed out the threadlike adhesive 2 from the winding body 240. That is, the rollers 234 and 236 function as a feed out assist mechanism. The motor is provided with a speed volume (not shown) for adjusting a rotation speed of the motor 233, that is, for manually adjusting a feed out speed of the threadlike adhesive 2.

The gripping portion 231 having a substantially rectangular plate shape is provided slightly below the center of the main body frame 230 so as to protrude rearward. The gripping portion 231 is gripped by an operator. The gripping portion 231 is provided with a switch 231A for switching on/off of the motor 233 to start/stop feed out of the threadlike adhesive 2. As an example, the switch 231A is provided at a position where the operator can easily operate the switch 231A with an index finger in a state where the operator grips the gripping portion 231, turns on the motor 233 while the switch 231A is pressed, and turns off the motor 233 when the switch 231A is released from the pressing (that is, when the switch 231A is not pressed).

The opening/closing frame 235 includes a roller holding unit 237 that rotatably holds the roller 236 in the vertical plane, and a winding body holding unit 238 that rotatably holds the winding body 240 in the perpendicular plane. The opening/closing frame 235 is pivotally supported by the main body frame 230 at the rear of the lower end side, and can be opened and closed with respect to the main body frame 230.

In an open state shown in FIG. 25, the operator sets the winding body 240 in the winding body holding unit 238, and inserts the threadlike adhesive 2 into the inside of the nozzle 107 via the rotation surface of the roller 236. Then, the operator rotates the opening/closing frame 235, on which the winding body 240 is set, rearward to close the opening/closing frame 235, and engages the upper end of the opening/closing frame 235 with the main body frame 230 to bring the opening/closing frame 235 into a closed state shown in FIG. 24.

As shown in FIG. 24, the operator grasps the gripping portion 231 to bring the tip end (tip end opening 107c) of the nozzle 107 close to the adherend. At this time, in a case where the extra length of the threadlike adhesive 2 is short, the operator lowers the nozzle 107 in an oblique direction as shown in FIG. 23, so that the start point can be reliably created without the threadlike adhesive 2 entering the nozzle 107.

When the operator operates the switch 231A, the motor 233 is rotated, and the rollers 234 and 236 feed out the threadlike adhesive 2 from the winding body 240 by the rotation of the motor 233. When the operator moves the nozzle 107 on the adherend in any direction, the threadlike adhesive 2 fed out from the winding body 240 is stuck to the adherend in any path.

Figure 26:
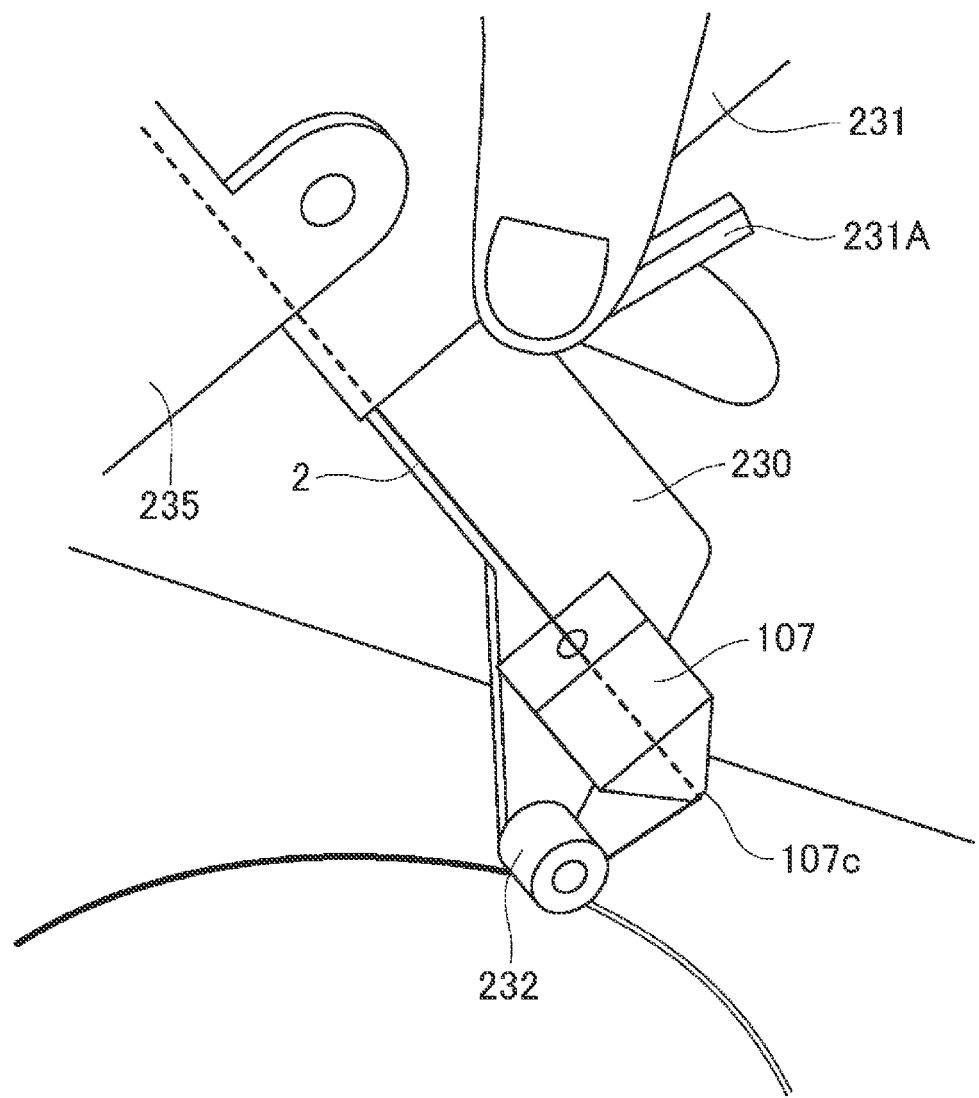
FIG. 26 is a view showing a state where a threadlike adhesive is cut at the end of a sticking operation using the threadlike adhesive sticking apparatus according to the fifth embodiment.

FIG. 26 shows a state where the threadlike adhesive 2 is cut at the end of the sticking operation using the threadlike adhesive sticking apparatus 200A. When the sticking operation ends, the operator operates (releases the pressing of) the switch 231A to stop the rotation of the motor 233. At an end point position, as shown in FIG. 26, the operator tilts the main body frame 230 with respect to a vertical direction, and presses the threadlike adhesive 2 against the adherend by the pressing roller 232. By pressing the threadlike adhesive 2 with the pressing roller 232, it is possible to prevent a stuck portion (end point of the threadlike adhesive 2) from being lifted and peeled off.

The operator cuts the threadlike adhesive 2 in the vicinity of the end point with a scissor 241 in a state where the end point is pressed by the pressing roller 232 as described above. Since the pressing roller 232 is provided in the vicinity of the nozzle 107, the operator can prevent peeling of the end point of the threadlike adhesive 2 by a simple operation of merely tilting the threadlike adhesive attaching device 200A (main body frame 230) while gripping the threadlike adhesive sticking apparatus 200A.

As described above, according to the threadlike adhesive sticking apparatus 200A of the present embodiment, although the workability in a narrow location is better in the threadlike adhesive sticking apparatus 100 of the second embodiment, similarly to the second embodiment, it is possible to easily change the sticking direction since a plurality of portions of the peripheral portion of the tip end opening 107c of the nozzle 107 function as the pressing unit. Therefore, the operator can stick the threadlike adhesive 2 while gripping the gripping portion 231 and moving the threadlike adhesive 2 in any direction.

Sixth Embodiment

Figure 27:
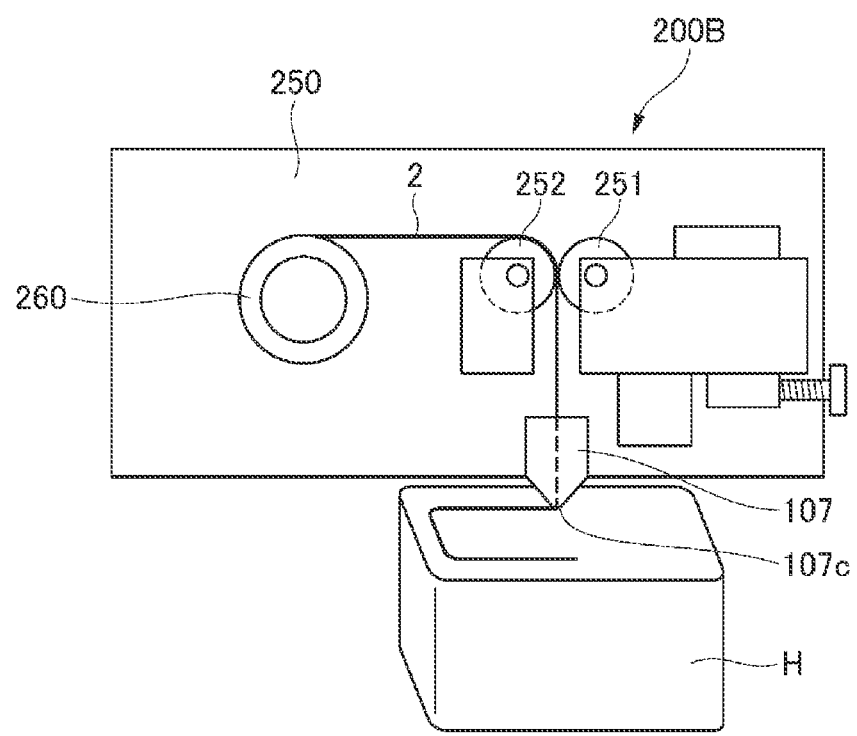
FIG. 27 is a schematic view showing a threadlike adhesive sticking apparatus according to a sixth embodiment.

FIG. 27 is a schematic view showing a threadlike adhesive sticking apparatus 200B according to a sixth embodiment. The threadlike adhesive sticking apparatus 200B includes an attachment plate 250, rollers 251 and 252 provided on the attachment plate 250, and the nozzle 107. A winding body 260 capable of winding the threadlike adhesive 2 is rotatably held by the attachment plate 250 in a vertical plane. The threadlike adhesive sticking apparatus 200B is a stationary sticking apparatus in which, for example, the attachment plate 250 is fixedly disposed and used on a table by a support frame.

The rollers 251 and 252 are disposed on a side (right side in FIG. 27) of the winding body 260 on the front surface side of the attachment plate 250. The roller 251 is driven by a motor provided on the rear side of the attachment plate 250. The roller 252 sandwiches the threadlike adhesive 2 with the roller 251, and is rotated with the rotation of the roller 251. By the rotation of the rollers 251 and 252, the threadlike adhesive 2 is fed out from the winding body 260. The nozzle 107 is fixed below (directly below) the rollers 251 and 252 at the lower end of the attachment plate 250.

The operator drives the motor to feed out the threadlike adhesive 2, brings the adherend H into contact with the tip end opening 107c of the nozzle 107, and sticks the threadlike adhesive 2 in any path while moving the adherend H. At the end of the sticking, the driving of the motor is stopped, and the threadlike adhesive 2 is cut by a scissor or the like.

As described above, according to the threadlike adhesive sticking apparatus 200B according to the sixth embodiment, the operator can stick the threadlike adhesive 2 to the adherend H having a planar or three-dimensional shape in any path by gripping the adherend H and moving the adherend H while bringing the adherend H into contact with the tip end opening 107c of the nozzle 107.

(Details of Threadlike Adhesive 2)

Figure 28:
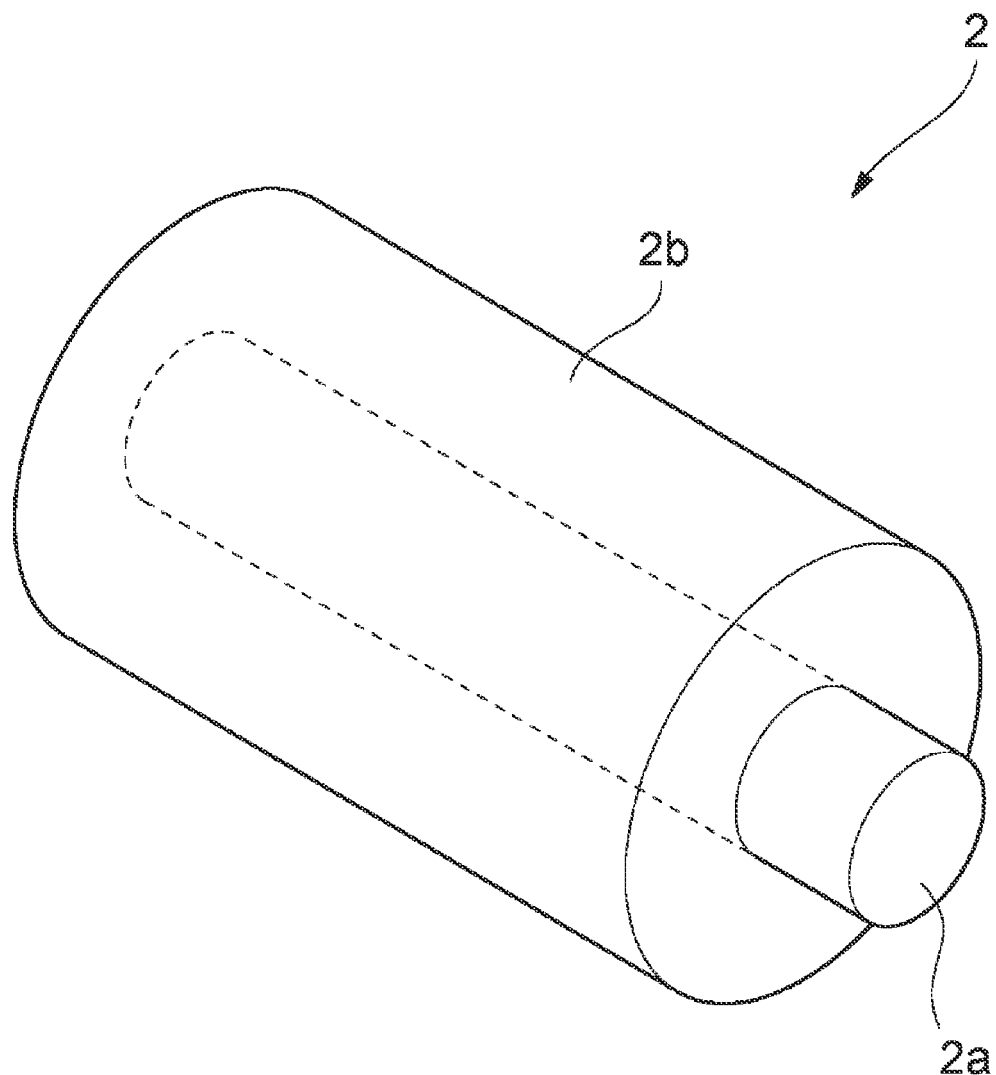
FIG. 28 is a schematic view showing a threadlike adhesive used in the threadlike adhesive sticking apparatus.

FIG. 28 shows a schematic view of the threadlike adhesive 2 used in the threadlike adhesive sticking apparatuses 100, 101 and the like according to the first to sixth embodiments. The threadlike adhesive 2 is constituted by a linear adhesive body including a linear core material 2a and an adhesive layer 2b that covers a surface of the core material 2a in a longitudinal direction.

The threadlike adhesive 2 is an elongated adhesive body and has a linear shape. The linear shape mentioned here is a concept including not only a straight line shape, a curved line shape, a polygonal line shape, and the like, but also a state in which a material can be bent in various directions and angles like a filament (i.e., a threadlike shape). In addition, the adhesive layer in the present specification also includes a linear adhesive layer.

Although a cross-sectional shape of the threadlike adhesive 2 in the present configuration example is a circular shape, the present embodiment is not limited thereto, and the cross-sectional shape may be an elliptical shape, a rectangular shape such as a quadrangular shape, or the like, in addition to the circular shape.

The adhesive layer 2b contains an adhesive formed of an adhesive composition. The adhesive is not particularly limited, and a known adhesive can be used. Examples of the adhesive include an acrylic-based adhesive, a rubber-based adhesive, a vinyl alkyl ether-based adhesive, a silicone-based adhesive, a polyester-based adhesive, a polyamide-based adhesive, a urethane-based adhesive, a fluorine-based adhesive, and an epoxy-based adhesive. Among these adhesives, an acrylic-based adhesive, a urethane-based adhesive, a silicone-based adhesive, a rubber-based adhesive, or a polyester-based adhesive is preferable, and an acrylic adhesive is particularly preferable from the viewpoint of adhesiveness. The adhesive may be used alone or in combination of two or more kinds thereof. The adhesive in this embodiment is preferably a pressure-sensitive adhesive that has adhesiveness at room temperatures and can be stuck to a surface of an adherend by a pressure generated when a surface of the adhesive and the surface of the adherend are brought into contact with each other. When the adhesive is a pressure-sensitive adhesive, the adhesive does not need to be heated and can be applied to an adherend that is sensitive to heat.

As the adhesive, either a solvent-type adhesive or a water-dispersible type adhesive can be used. The adhesive is preferably an adhesive obtained by performing crosslinking by drying (solvent volatilization) an adhesive composition and rapidly completing the crosslinking after drying. This is because new crosslinking does not increase after surfaces of adhesive layers come into contact with one another. Here, the adhesive is preferably a water-dispersible type adhesive, and more preferably a water-dispersible type acrylic adhesive because of high-speedily coating, being friendly to the environment, and a small influence on a base material or a core material (swelling or dissolution).

In the adhesive body having a core material, an adhesive layer may cover the entire surface of the core material (a surface in a longitudinal direction), or may cover only at least a part of the surface of the core material. Although an adhesive layer is typically formed to be continuous, the adhesive layer is not limited to such a form, and may be formed in a regular such as a dot pattern or a stripe pattern or random pattern. An end surface of the core material may or may not be covered with an adhesive layer. For example, when the adhesive body is cut during a producing process or during use, the end surface of the core material may not be covered with the adhesive layer.

As the core material used in the threadlike adhesive 2, for example, a resin, a rubber, a foam, an inorganic fiber, a composite thereof, or the like can be used. Examples of the resin include: polyolefins such as polyethylene (PE), polypropylene (PP), an ethylene-propylene copolymer, and an ethylene-vinyl acetate copolymer; polyesters such as polyethylene terephthalate (PET); a vinyl chloride resin; a vinyl acetate resin; a polyimide resin; a polyamide resin; and a fluorine-based resin. Examples of the rubber include a natural rubber, and a synthetic rubber such as a urethane rubber. Examples of the foam include a foamed polyurethane and a foamed polychloroprene rubber. Examples of the fiber include a glass fiber, a carbon fiber, a metal fiber, a chemical fiber (a regenerated fiber, a semi-synthetic fiber, a synthetic fiber, etc.), and a natural fiber (a plant fiber, an animal fiber, etc.). A cross-sectional shape of the core material is not particularly limited, and is usually a cross-sectional shape corresponding to a cross-sectional shape of the adhesive body.

Examples of a material of the threadlike core material that can be used in the threadlike adhesive 2 include various polymer materials such as rayon, cupra, acetate, promix, nylon, aramid, vinylon, vinylidene, polyvinyl chloride, polyester, acryl, polyethylene, polypropylene, polyurethane, polychlal, and polylactic acid; glasses, carbon fibers, various rubbers such as natural rubber and synthetic rubber such as polyurethane; natural materials such as cotton and wool; and metal. As the form of the threadlike core material, for example, monofilaments, multifilaments, span yarns, finished yarns generally called textured yarn, bulky yarn and stretched yarn that have been subjected to crimping or bulking or combined yarns obtained by, for example, twisting those can be used. The cross-sectional shape is not limited to only a circle, and can be a rectangular shape such as a square shape, a star shape, an elliptical shape, a hollow shape, and the like.

The core material may contain various additives such as a filler (inorganic filler, organic filler or the like), an age resister, an antioxidant, a UV absorber, an antistatic agent, a lubricant, a plasticizer, and a coloring agent (pigments, dyes or the like) as necessary. A known or common surface treatment such as a corona discharge treatment, a plasma treatment or application of an undercoat agent may be performed on the surface of the core material.

A size of a cross-section of the core material is not particularly limited and may be appropriately selected depending on a purpose. For example, when the cross-sectional shape of the core material is a circular shape, a diameter of the cross-sectional shape of the core material is preferably 1 µm to 2000 µm, and more preferably 10 µm to 1000 µm from the viewpoint of handleability (flexibility, difficulty in cutting).

A thickness of the adhesive layer is not particularly limited, and is, for example, preferably 1 µm or more, and more preferably 3 µm or more from the viewpoint of adhesiveness. The thickness of the adhesive layer is, for example, preferably 200 µm or less, and more preferably 150 µm or less from the viewpoint of thickness unevenness and drying properties. Further, the thickness can be increased according to an application by stacking layers.

In particular, the threadlike adhesive 2 is preferably a pressure-sensitive adhesive body in which the adhesive forming the adhesive layer 2b has adhesiveness at room temperature and that can be stuck to a surface of an adherend by a pressure generated when a surface of the adhesive and the surface of the adherend are brought into contact with each other. When the adhesive body is a pressure-sensitive adhesive body, the adhesive body does not need to be heated and can be applied to an adherend that is sensitive to heat.

As described above, the shape of the threadlike adhesive 2 is not particularly limited. The larger a ratio (major axis/minor axis) of a length of the major axis (the longest axis that passes through the center of gravity of the cross-sectional shape) to a length of the minor axis (the shortest axis that passes through the center of gravity of the cross-sectional shape) of the cross-sectional shape of the thread-like adhesive 2 is, the flatter the shape of the threadlike adhesive 2 is. On the other hand, as the ratio becomes smaller, the cross-sectional shape of the threadlike adhesive 2 comes close to a circular shape. When the cross-sectional shape of the threadlike adhesive 2 is a circular shape, the ratio has a minimum value of 1. When the ratio has a minimum value of 1, the cross-sectional shape of the thread-like adhesive 2 also includes a special shape such as a triangle and a star shape.

The threadlike adhesive 2 may have a release liner. When the threadlike adhesive 2 has a release liner, the release liner is released from the adhesive layer before the threadlike adhesive 2 reaches the nozzle 107 or the like, and the adhesive body is stuck to the object. Since the threadlike adhesive 2 has the release liner, the self-adhesion force of the adhesive can be reduced, and thus the threadlike adhesive 2 can be pressed against an object in a state where the tension of the threadlike adhesive 2 is reduced. Therefore, it is possible to prevent a problem that the threadlike adhesive 2 pressed against the object is peeled off, cut, re-stuck, and entangled by tension, and to smoothly stick the threadlike adhesive 2.

Embodiments and usage methods of the threadlike adhesive 2 are roughly classified into the following four patterns. Here, a non-adhesive layer is a layer that covers a surface (a surface in the longitudinal direction) of the adhesive body, and the non-adhesive layer includes, for example, a layer that covers the adhesive body in an initial state before stretching and is cut out by stretching the adhesive body to exhibit adhesiveness of the adhesive body. A type, a material, and the like of the non-adhesive layer are not particularly limited.

1) An adhesive body without a non-adhesive layer is directly pressure-bonded.
2) An adhesive body without a non-adhesive layer+a release liner (the release liner is released before pressure-bonding)
3) An adhesive body covered with a non-adhesive layer
4) An adhesive body covered with a non-adhesive layer+a release liner (the release liner is released before pressure-bonding)

Further, the threadlike adhesive 2 of the present embodiment has flexibility and has a threadlike shape that can be bent in various directions and angles like a filament. The adhesive body having flexibility, in particular, an adhesive body having a threadlike shape, has an advantage in that the adhesive body can be easily applied to complicated shapes such as a curved line, a curved surface, and unevenness in addition to the effects described above.

For example, when an adhesive tape is stuck to an adherend having a part with a complicated shape such as a curved line, a curved surface, or an uneven shape, a wrinkle or overlapping may occur in the adhesive tape in such a part, and it is difficult to finely stick the adhesive tape while preventing a protrusion. The part where a wrinkle or overlapping occurs may cause a decrease in the adhesive strength. In order to stick the adhesive tape while preventing the occurrence of a wrinkle or overlapping, it is conceivable to stick the adhesive tape while finely cutting the adhesive tape. However, workability significantly deteriorates. On the other hand, an adhesive body having flexibility, in particular, a threadlike adhesive body can be firmly stuck without causing a wrinkle or overlapping even when being stuck to a part having a complicated shape such as a curved line, a curved surface, and an uneven shape. Further, since such an adhesive body can be stuck to a part to be stuck at one time, that is, in one step, the adhesive body is excellent in workability and can be applied to an automation line.

Specific examples of an application of the threadlike adhesive body include an application to fix cables such as electric wires or optical fibers, optical fiber sensors such as LED fiber light and Fiber Bragg Gratings (FBG), various wire members (linear members) such as a yarn, a string, and a wire, and a narrow member, in a desired form. For example, even in a case where a wire member or a narrow member is fixed to another member in a complicated shape, the threadlike adhesive body can be firmly fixed with excellent workability while preventing protrusion, wrinkles, and overlapping in accordance with the complicated shape that the wire member or the narrow member have. In a case where the wire member or the narrow member is fixed to another member, the threadlike adhesive body is stuck in advance in accordance with a form in which the wire member or the narrow member is to be fixed on a surface of the other member, and then, the wire member or the narrow member can be bonded and fixed in accordance with the adhesive body stuck to the surface of the other member. Alternatively, the threadlike adhesive body is stuck to a wire member or a narrow member, and then, the wire member or the narrow member may be fixed to another member in a desired form.

The threadlike adhesive body can also be suitably used for temporary fixing (temporary tacking) of an article for temporarily fixing (temporarily tacking) one article to a surface of another article. More specifically, the threadlike adhesive body can be particularly suitably used for temporary fixing (temporary tacking) in producing, for example, fiber products and leather products such as clothes, shoes, bags, and hats. However, the application is not limited to this example, and the threadlike adhesive body is suitably used for various applications in which temporary fixing (temporary tacking) is desired.

For example, when one article is fixed to a surface of another article, the one article is temporarily fixed and positioned on the surface of the other article in advance using the threadlike adhesive body, and then both articles are fixed (finally fixed) by a fixing method such as thermocompression bonding and sewing. In this case, the threadlike adhesive body easily and temporarily fixes the two articles with avoiding a fixing unit provided between the two articles. For example, in a case where a fiber product or a leather product is sewn, when temporary fixing is performed using the threadlike adhesive body, the temporary fixing can be easily performed while avoiding a part to be sewed, and the adhesive can be easily prevented from adhering to a needle.

In addition, the threadlike adhesive body can be well stuck while preventing a protrusion, a wrinkle, and overlapping even when shapes of two articles are a complicated shape such as a curved line, a curved surface, and an uneven shape. Further, the threadlike adhesive body can be stuck in one step, and workability is improved.

Even in a case of a member that is likely to be deformed, such as fabric, cloth, and leather that forms a fiber product or a leather product, temporary fixing can be performed using the threadlike adhesive body, so that deformation of the member due to tension can be inhibited, and a design after fixing (final fixing) is improved.

Further, in the case of using the threadlike adhesive body, after two articles are fixed (finally fixed), the threadlike adhesive body can be pulled out and removed if necessary from the two articles that are fixed (finally fixed). In this case, the adhesive can be prevented from squeezing out, and deterioration of a design due to aging discoloration of the remaining adhesive can be satisfactorily prevented.

Furthermore, the threadlike adhesive body can be twisted with a yarn made of other material to form a composite yarn or can be woven with a yarn or cloth (including nonwoven fabric and sheet) made of other material, thereby function combination can be attempted.

Further, the threadlike adhesive 2 stuck to the release liner (temporary support) can be transferred to the adherend by the threadlike adhesive sticking apparatus and the method of sticking threadlike adhesive of the present embodiment. The method will be described below.

First, the threadlike adhesive 2 is stuck to a temporary support in the form of a film or the like by the threadlike adhesive sticking apparatus and the method of sticking a threadlike adhesive of the present embodiment described above. In order to stuck the threadlike adhesive 2 to the adherend in a desired shape, the threadlike adhesive 2 is stuck (drawn) on the temporary support in a shape obtained by inverting the desired shape. Next, the adhesive surface of the threadlike adhesive 2 stuck to the temporary support is brought into contact with the adherend, and the threadlike adhesive 2 is pressed and bonded to the adherend through the temporary support by a roller, a finger, or the like.

Thereafter, the temporary support is released and removed from the threadlike adhesive 2 adhered to the adherend to expose the threadlike adhesive 2. In this way, the threadlike adhesive 2 is stuck to the adherend in a desired shape.

In order to reliably transfer the threadlike adhesive, that is, in order to prevent the threadlike adhesive from being peeled off from the adherend and remaining on the temporary support, it is preferable to peel off the temporary support from the adherend by peeling, and a peeling angle at this time is preferably 5° or more, more preferably 10° or more, and still more preferably 20° or more. When peeling the temporary support by peeling, the temporary support may be peeled off while being deformed, the adherend may be peeled off while being deformed, or both the temporary support and the adherend may be peeled off while being deformed. A suitable peeling method may be appropriately selected according to the hardness (deformability) of the temporary support and the adherend.

As described above, the threadlike adhesive 2 is formed (drawn) on the temporary support into a shape obtained by inverting a desired shape and then transferred to stick the threadlike adhesive 2 to the adherend in a desired shape. Accordingly, the threadlike adhesive 2 can be easily stuck to the adherend even when the sticking shape is complicated.

Based on such a feature, the method of sticking the threadlike adhesive by transfer is suitable as, for example, a method of sticking the threadlike adhesive body for fixing a cable such as an electric wire or an optical fiber, a LED fiber light, optical fiber sensors such as fiber Bragg gratings (FBG), various wires (linear members) such as a yarn, a string, or a wire, or a narrow member in a desired form. Even in the case of fixing a wire or a narrow member to another member having a complicated shape, with the method of sticking the threadlike adhesive by transfer, the threadlike adhesive can be easily stuck to a member to which a wire or a narrow member is stuck according to a complicated shape of the wire or the narrow member.

For example, in a case where the threadlike adhesive is used for temporary fixing when sewing fiber products or leather products such as clothes, shoes, bags, or hats, it is easy to temporarily fix the threadlike adhesive while avoiding a part to be sewed, and it is possible to easily prevent the adhesive from adhering to the needle. When an article to be sewn has a complicated shape or is easily deformed, it may not be easy to stick the threadlike adhesive. However, even in such a case, the threadlike adhesive can be easily stuck by the method of sticking the threadlike adhesive by transfer.

Noted that the present invention is not limited to the embodiment described above, and modifications, improvements, and the like can be made as appropriate. Materials, shapes, sizes, numerical values, forms, numbers, arrangement positions, and the like of components in the embodiments described above are set as desired and are not limited as long as the present invention can be achieved.

EXAMPLE

Hereinafter, the present invention will be described in more detail with reference to Examples and the like, but the present invention is not limited to the following Examples.

Example (Preparation of Coating Solution)

Into a reaction vessel equipped with a cooling tube, a nitrogen introduction tube, a thermometer, and a stirrer, 40 parts by mass of ion-exchanged water was added, and stirring was performed at 60° C. for 1 hour or more while introducing nitrogen gas to carry out nitrogen substitution. To this reaction vessel, 0.1 parts by mass of 2,2'-azobis[N-(2-carboxyethyl)-2-methylpropionamidine]n hydrate (polymerization initiator) was added. While the system was maintained at 60° C., a monomer emulsion A was gradually added dropwise thereto over 4 hours to allow an emulsion polymerization reaction to proceed.

As the monomer emulsion A, used as an emulsion obtained by adding and emulsified 98 parts by mass of 2-ethylhexyl acrylate, 1.25 parts by mass of acrylic acid, 0.75 parts by mass of methacrylic acid, 0.05 parts by mass of lauryl mercaptan (chain transfer agent), 0.02 parts by mass of γ-methacryloxypropyltrimethoxysilane (manufactured by Shin-Etsu Chemical Co., Ltd., trade name: "KBM-503"), and 2 parts by mass of sodium polyoxyethylene lauryl sulfate (emulsifier) to 30 parts by mass of ion-exchanged water.

After completion of the dropwise addition of the monomer emulsion A, the system was further kept at 60° C. for 3 hours and cooled to room temperature, and pH was then adjusted to 7 by addition of 10% ammonia water to obtain an acrylic polymer emulsion (water-dispersible acrylic polymer).

A tackifying resin emulsion (manufactured by Arakawa Chemical Industries, Ltd., trade name: "E-865NT") was added in an amount of 24 parts by mass based on the solid content per 100 parts by mass of the acrylic polymer contained in the above acrylic polymer emulsion. Further, ion exchange water was added to adjust the solid content concentration to 50 mass %, thereby obtaining a coating solution.

(Production of Threadlike Adhesive)

As a core material, a multifilament yarn was prepared by twisting seven polyester fibers having the number of filaments of 336 and a fineness of 1155 dtex 70 times/m.

The core material was coated by dipping the coating solution, in which a viscosity of the coating solution under the condition of a shear rate of 100 (1/s) was 0.4 Pa·s, and a viscosity of the coating solution under the condition of a shear rate of 0.1 (1/s) was 47 Pa·s, using a coating roller being rotated at the same speed as the feeding speed. At this time, a tension of 1.3 mN/dtex was applied to the core material. Thereafter, the resultant was dried at 100° C. for 4 minutes to obtain a threadlike adhesive body having a diameter (width in a lateral direction) of 0.45 mm.

(Viscosity of Coating Solution)

A viscosity of the coating solution was measured when the shear rate was changed from high speed (viscosity decrease) to low speed (viscosity recovery).

Specifically, 1 g of a sample (coating solution) was placed in a measurement plate (MP35 Steel, 18/8, sensor: Rotor C35/1, Cone with D=35 mm, 1° Titan, gap between plates: 0.225 mm), and the solution viscosity (Pa·s) of the coating liquid was first measured at a shear rate of 0.01 (1/s) for 10 seconds under a condition of 23° C. using a viscosity-viscoelasticity measuring device (rheometer, trade name "RS-600", manufactured by HAAKE). Thereafter, the shear rate was changed to 9000 (1/s) (A) over 20 seconds, and then, the shear rate returned to 0.01 (1/s) (B) over 20 seconds, and the solution viscosity (Pa·s) of the coating solution during this period was measured.

A value of the solution viscosity (Pa·s) of the coating solution at a time point when a shear rate was 100 (1/s) during the period in which the above shear rate was changed to 9000 (1/s) (A) was the solution viscosity (Pa·s) at a shear rate of 100 (1/s). A value of the solution viscosity (Pa·s) of the coating solution at a time point when a shear rate was 0.1 (1/s) during the period in which the shear rate returned to 0.01 (1/s) (B) was the solution viscosity (Pa·s) at a shear rate of 0.1 (1/s).

(Tension of Core Material)

The tension of the core material was measured using a digital force gauge (AD-4932A) during coating. Specifically, the tension between a feeding point of the core material and a coating roll was measured by reading the stress applied to a terminal of the force gauge.

(Evaluation Results when Nozzle Hole Diameter is Changed)

Using the threadlike adhesive having a diameter of 0.45 mm produced as described above, a linear shape/curved shape (R=10 mm, 5 mm, 2 mm, 1 mm) was drawn by changing the sticking speed of the threadlike adhesive to 1, 10, 20, 50, 100, 150, 200 mm/sec when the nozzle hole diameter was set to 1 mm and 2 mm. The experimental results are as follows.

In the case of a nozzle hole diameter of 1 mm, when drawing a linear shape, the threadlike adhesive was accurately stuck at each sticking speed excluding 200 mm/sec. In the case of drawing a curved shape, the threadlike adhesive was stuck at a sticking speed of 20 mm/sec or less (10 mm/sec or less in the case of R=1 mm).

In the case of a nozzle hole diameter of 2 mm, when drawing a linear shape, the threadlike adhesive was accurately stuck at each sticking speed of 20 mm/sec or less. When drawing a curved shape, the threadlike adhesive was stuck at a sticking speed of less than 10 mm/sec in the case of R=10 mm.

From the above results, it was found that in the case of the threadlike adhesive having a diameter of 0.45 mm, the nozzle hole diameter is preferably 0.7 mm.

INDUSTRIAL APPLICABILITY

According to the threadlike adhesive sticking apparatus and the method of sticking a threadlike adhesive of the present invention, the threadlike adhesive can be smoothly fed out and accurately stuck to any path. Therefore, the present invention can be applied to bonding work in various fields.

Although preferred embodiments of the present invention have been described above, the present invention is not limited to the above embodiments, and various modifications and substitutions can be added to the above embodiments without departing from the scope of the present invention.

REFERENCE SIGNS LIST

1 Main body
2 Threadlike adhesive
3 Grip
4 Tip end portion
5, 120 Winding body
100, 101, 101A, 101B, 200, 200A, 200B Threadlike adhesive sticking apparatus
105 Horizontal moving unit
106, 201 Attachment plate
106a Roller attachment portion
106b Nozzle attachment portion
107 Nozzle
107d Tip end
136, 137, 215 Spring
150A to 150E Feed out assist mechanism
AU Supply unit
BU Pressing mechanism
CU Conveyance unit
DU Positioning unit

The invention claimed is:

1. A threadlike adhesive sticking apparatus that presses a threadlike adhesive wound around a winding body against an object while feeding out the threadlike adhesive, the apparatus comprising:
   an assist mechanism configured to apply an external force in a feeding direction to the threadlike adhesive fed out from the winding body; and
   a pressing unit configured to press the threadlike adhesive fed out from the winding body against the object.

2. The threadlike adhesive sticking apparatus according to claim 1, wherein the assist mechanism is provided in a path for conveying the threadlike adhesive from the winding body to the pressing unit, and applies, to the threadlike adhesive, a tensile force for pulling the threadlike adhesive sandwiched by the assist mechanism in the feeding direction.

3. The threadlike adhesive sticking apparatus according to claim 2, wherein
   the assist mechanism includes a first roller and a second roller configured to sandwich the threadlike adhesive between the first roller and the second roller,
   the first roller is rotated by a driving force from a driving source or manually,
   the second roller is rotated in conjunction with rotation of the first roller, and
   the first roller and the second roller pull the threadlike adhesive sandwiched between the first roller and the second roller in a rotation direction.

4. The threadlike adhesive sticking apparatus according to claim 3, wherein the assist mechanism further includes an elastic body attached to the second roller, and
   the elastic body configured to press the second roller against the first roller.

5. The threadlike adhesive sticking apparatus according to claim 2, wherein
   the assist mechanism includes a third roller and a fourth roller configured to chuck and release the threadlike adhesive between the third roller and the fourth roller, and a fifth roller disposed between the winding body and rollers of the third roller and fourth roller in the path,
   the fifth roller is displaceable so as to lengthen a path from the winding body to the third roller and the fourth roller via the fifth roller, and
   the threadlike adhesive is fed out by a displacement of the fifth roller, the threadlike adhesive is chucked by the third roller and the fourth roller and supplied to the pressing unit, and the pressing unit presses the threadlike adhesive against the object after the chuck of the third roller and the fourth roller is released.

6. The threadlike adhesive sticking apparatus according to claim 1, wherein the assist mechanism applies, to the threadlike adhesive, an extrusion force for feeding the threadlike adhesive by rotating the winding body in the feeding direction.

7. The threadlike adhesive sticking apparatus according to claim 6, wherein the assist mechanism comes into contact with, the threadlike adhesive wound around the winding body or an outer peripheral surface of the winding body, to rotate the winding body in the feeding direction.

8. The threadlike adhesive sticking apparatus according to claim 1, wherein a member that applies tension to the threadlike adhesive is not provided in a path for conveying the threadlike adhesive between the assist mechanism and the pressing unit.

9. The threadlike adhesive sticking apparatus according to claim 1, further comprising:
   a nozzle having an inner wall surface defining a cylindrical internal space and a tip end having a tip end opening allowing the internal space to communicate with an outside at one end of the inner wall surface, wherein
   the pressing unit presses the threadlike adhesive, which is allowed to pass through the internal space and is led out to the outside from the tip end opening, against the object, and
   a plurality of portions of a peripheral portion surrounding the tip end opening at the tip end function as the pressing unit.

10. The threadlike adhesive sticking apparatus according to claim 1, further comprising:
    a displacement unit attached to the pressing unit and configured to displace the pressing unit by being displaced in a pressing direction; and
    an absorption mechanism configured to absorb a displacement of the pressing unit with respect to a displacement of the displacement unit in the pressing direction.

11. A method of sticking a threadlike adhesive, comprising sticking the threadlike adhesive to the object using the threadlike adhesive sticking apparatus according to claim 1.

* * * * *